US006044710A

United States Patent [19]
Kurita et al.

[11] Patent Number: 6,044,710

[45] Date of Patent: Apr. 4, 2000

[54] ELLIPTICAL VIBRATORY APPARATUS

[75] Inventors: Yutaka Kurita, Hikone; Yasushi Muragishi; Hitoshi Yasuda, both of Ise, all of Japan

[73] Assignee: Shinko Electric Company, Ltd., Japan

[21] Appl. No.: 09/046,752

[22] Filed: Mar. 24, 1998

Related U.S. Application Data

[62] Division of application No. 08/620,676, Mar. 26, 1996, Pat. No. 5,804,733.

[30] Foreign Application Priority Data

Mar. 31, 1995 [JP] Japan .................................... 7-100467
Mar. 31, 1995 [JP] Japan .................................... 7-100468

[51] Int. Cl.$^{7}$ ............................... G01M 7/06; B07B 1/36

[52] U.S. Cl. ......................... 73/664; 198/751; 198/752.1; 198/757

[58] Field of Search ..................................... 198/751, 753, 198/756, 757, 752.1; 73/662, 664, 668, 667; 310/316

[56] References Cited

U.S. PATENT DOCUMENTS 3,654,804 4/1972 Helmuth .
4,002,270 1/1977 Reiner .
4,395,665 7/1983 Buchas .
4,692,649 9/1987 Izukawa et al. ........................ 310/316
5,042,643 8/1991 Akama .................................... 198/753
5,074,403 12/1991 Myhre .................................... 198/751
5,205,395 4/1993 Bruno et al. .

FOREIGN PATENT DOCUMENTS

WO 92/22861 12/1992 WIPO .
WO 93/15850 8/1993 WIPO .

OTHER PUBLICATIONS

European Search Report for application No. EP 96 30 2152, Feb. 26, 1998.

*Primary Examiner*—Hezron Williams
*Assistant Examiner*—Rose M. Miller
*Attorney, Agent, or Firm*—Piper Marbury Rudnick & Wolfe

[57] ABSTRACT

The invention disclosed is an elliptical vibratory apparatus including a first controller which includes at least a first phase shifter, a first high-gain amplifier and a first saturating element; a first power amplifier for amplifying an output of the first controller; a first vibratory exciter receiving an output of the first power amplifier for generating a horizontal vibrational force in a horizontal direction; a horizontal vibrational system of an elliptical vibratory machine receiving said horizontal vibrational force; a vibrational displacement detector for detecting a horizontal displacement of a movable part of the elliptical vibratory machine in the horizontal direction, the output of the vibrational detector being supplied to both the input of the first controller and the input of a second controller; the second controller including at least a second phase shifter, a second high-gain amplifier and a second saturating element; a second power amplifier for amplifying an output of the second controller; a second vibratory exciter receiving an output of the second power amplifier for generating a vertical vibrational force in a vertical direction; a vertical vibrational system of the elliptical vibratory machine receiving the vertical vibrational force; a closed loop being formed by the first controller, the first power amplifier, the first vibratory exciter, the horizontal vibrational system and the vibrational displacement detecting means, the output of the vibrational displacement means being negatively fed-back to the first controller in the closed loop; wherein a shift angle α of the first phase shifter is so predetermined that there is a phase difference of 180 degrees between the output terminal of the vibrational displacement detector and the input terminal of the first controller, when these terminals are cut off from each other, and a shift angle β of the second phase shifter is so predetermined as to obtain a predetermined phase difference between phase difference between the vibrational displacements of the horizontal and vertical vibrational systems for the optimum condition of the elliptical vibratory machine, the horizontal vibrational system being self-excitedly vibrated at its resonant frequency and the vertical vibrational system being self-excitedly vibrated.

5 Claims, 21 Drawing Sheets

ELLIPTICAL VIBRATORY APPARATUS

This application is a division of application Ser. No. 08/620,676 filed Mar. 26, 1996, now U.S. Pat. No. 5,804,733.

BACKGROUND OF THIS INVENTION

1. Field of the Invention

This invention relates to an elliptical vibrator apparatus which is used, for example, for handling parts such as bolts, nuts, and transistors.

2. Description of the Prior Art

In FIG. 1, an elliptical vibration parts-feeder is generally denoted by a reference numeral 1 and it is provided with a well-known bowl 2. A spiral track is formed in the wall of the bowl 2. A wiper as one of parts-orientating means is arranged at a suitable position of the down-stream side of the spiral track. The detail of the wiper is well-known and the drawing of the detail will be omitted. A flat plate is bent to form the wiper. The distance between the lower end of the flat plate and the track is larger than the thickness of a part to be handled in the bowl 2. But, it is smaller than the double of it. A posture-holding means is arranged at a discharge end portion of the spiral track. The parts of a predetermined posture are supplied through the posture holding means into a not-shown linear vibratory feeder as a next step.

The bowl 2 is fixed on an upper movable frame 7 as shown in FIG. 2. A similarly cross-shaped lower movable frame 8 as clearly shown in FIG. 3 is combined with four sets of vertical leaf springs 9 with the upper movable frame 7. Upper ends of the leaf spring 9 are fixed to the end portions 7*a* of the upper movable frame 7. The lower ends of leaf springs 9 are fixed to the end portions 8*a* of the lower movable frame 8. The end portions 7*a* and 8*a* are in alignment with each other in the vertical direction.

A vertical drive electro-magnet 11 is fixed at the central part of a stationary frame 10, facing to a central portion of the upper movable frame 7. A vertical movable core 13 is fixed to the lower side of the upper movable frame 7, facing to the vertical drive electro-magnet 11. A pair of horizontal drive electro-magnets 14*a* and 14*b* are fixed to side wall portions of the stationary frame 10 at both sides of the vertical drive electro-magnet 11. Electro-magnetic coils 15*a* and 15*b* are wound on the electro-magnet 14*a* and 14*b*. Horizontal movable cores 16*a* and 16*b* are fixed to the lower side of the upper movable frame 7, facing to the horizontal drive electromagnets 14*a* and 14*b*, respectively.

Four leg portions 17 are formed integrally with the stationary frame 10. The stationary frame 10 is supported through the leg portions 17 and vibration-absorbing rubbers 18 on the flour. Spring fixing portions 17*a* are formed integrally with the leg portions 17 as shown in FIG. 3. Leaf springs 19 are fixed to the spring fixing portions 17*a* as shown in the manner in FIG. 3. Both ends of the leaf springs 19 for the vertical drive are fixed to the spring fixing portions 17*a* by bolts B. The leaf springs 19 consist of two leaf spring elements which are superimposed through spacers 20 on each other. The central parts of the leaf springs 19 are fixed to the lower movable frame 8 by bolts B'.

In the above described arrangement, the horizontal drive electro-magnets 14*a*, 14*b* correspond to a first vibratory exciter for generating a horizontal exciting force. A first vibratory system to be driven by the horizontal electro-magnets 14*a*, 14*b* consists of the bowl 2, the leaf springs 9, the movable cores 16*a* and 16*b*, etc. The electro-magnet 11 correspond to a second vibratory exciter for generating a vertical exciting force. It consists of the bowl 2, the leaf springs 19, movable core 13, etc.

Generally, drive currents of the same frequency as the resonant frequency of the first (horizontal) vibratory system or nearly to the resonant frequency are supplied to the electro-magnets 14*a*, 14*b* and 11. Thus, the bowl 2 is vibrated at the resonant frequency $F_0$ or nearly at the frequency $f_0$ in the horizontal direction. The resonant frequency $f_1$ of the second (vertical) vibratory system in the vertical direction is usually higher by a few percentages than the horizontal resonant frequency $f_0$. As shown in FIG. 4, the phase difference between the force and vibrational displacement is equal to 90 degrees in the horizontal direction. That is clear from the vibration technology. The bowl 2 is vibrated at a different phase difference in the vertical direction. Thus, the bowl 2 is elliptically vibrated by the phase difference. The optimum phase difference between the vibrational displacements in the vertical and horizontal directions is theoretically equal to 60 degrees. In that case, the parts to be handled can be transported at the maximum transport speed on the track of the bowl 2. Accordingly, the phase difference is set to 90 degrees between the horizontal and vertical exciting forces. In other words, as clearly from FIG. 4, the resonant frequency in the vertical direction is equal to $f_1$ and so the vertical vibration occurs behind the vertical vibration force by the phase of 150 degrees.

As clear from the vibration technology, when a vibratory system is driven at the resonant frequency, a little change of the load of the parts in the bowl 2 and a little fluctuation of the power source cause to change the resonant frequency of the vibratory system. Accordingly, even when the bowl is vibrated at the horizontal resonant frequency $f_0$ and at the phase difference 90 degrees between the force and the displacement under no-load, the phase difference is varied with the fluctuation of the power source and the load of the parts. Accordingly, although the phase difference in the vertical direction changes little, it varies much in the horizontal direction. As the result, the phase difference between the vertical and horizontal vibrational displacements does not become equal to 60 degrees. Thus, the optimum vibrational condition cannot be obtained for the bowl 2.

SUMMARY OF THE INVENTION

Accordingly, it is an object of this invention to provide an elliptical vibratory apparatus which can maintain securely the optimum phase difference between the horizontal and vertical directions even when the power source fluctuates and the load of the parts varies with time.

In accordance with an aspect of this invention, an elliptical vibratory apparatus comprising:

(A) a first controller which includes at least a first phase shifter, a first high-gain amplifier and a first saturating element;

(B) a first power amplifier for amplifying an output of said first controller;

(C) a first vibratory exciter receiving an output of said first power amplifier for generating a first vibrational force in a first direction;

(D) a first vibrational system of an elliptical vibratory machine, receiving said first vibrational force;

(E) first vibrational displacement detecting means for detecting a vibrational displacement of a movable part of said elliptical vibratory machine in said first direction;

(F) a second controller which includes at least a second phase shifter, a second high-gain amplifier and a second saturating element;

(G) a second power amplifier for amplifying an output of said second controller;

(H) a second vibratory exciter receiving an output of said second power amplifier for generating a second vibrational force in a second direction;

(I) a second vibrational system of said elliptical vibratory machine, receiving said second vibrational force;

(J) second vibrational displacement detecting means for detecting another vibrational displacement of said movable part of said elliptical vibratory machine in said second direction;

(K) a closed loop being formed by said first controller said first power amplifier said first vibratory exciter said first vibrational system said first vibrational displacement detecting means said second controller said second power amplifier said second vibratory exciter said second vibrational system and said second vibrational displacement detecting means the output of said second vibrational displacement detecting means being negatively fed-back to said first controller in said closed loop; wherein shift angles of said first and second phase shifters are so predetermined that there is a phase difference of 180 degrees between the output terminal of said second vibrational displacement detecting means and the input terminal of said first controller, when these terminals are cut off from each other, and a predetermined phase difference can be obtained between said vibrational displacements of the first and second vibratory systems for the optimum condition of said elliptical vibratory machine, said first vibratory system being self-excitedly vibrated at its resonant frequency and said second vibratory system being self-excitedly vibrated.

In accordance with another aspect of this invention, an elliptical vibratory apparatus comprising:

(A) a first controller which includes at least a first phase shifter, a first high-gain amplifier and a first saturating element;

(B) a first power amplifier for amplifying an output of said first controller;

(C) a first vibratory exciter receiving an output of said first power amplifier for generating a first vibrational force in a first direction;

(D) a first vibrational system of an elliptical vibratory machine, receiving said first vibrational force;

(E) vibrational displacement detecting means for detecting a vibrational- displacement of a movable part of said elliptical vibratory machine in said first direction;

(F) a second controller which includes at least a second phase shifter, a second high-gain amplifier and a second saturating element;

(G) a second power amplifier for amplifying an output of said second controller;

(H) a second vibratory exciter receiving ah output of said second power amplifier for generating a second vibrational force in a second direction;

(I) a second vibrational system of said elliptical vibratory machine, receiving said second vibrational force;

(J) a closed loop being formed by said first controller said first power amplifier said first vibratory exciter said first vibrational system and said vibrational displacement detecting means the output of said vibrational displacement detecting means being negatively fed-back to said first controller in said closed loop; wherein shift angles of said first and second phase shifters are so predetermined that there is a phase difference of 180 degrees between the output terminal of said vibrational displacement detecting means and the input terminal of said first controller, when these terminals are cut off from each other, and a predetermined phase difference can be obtained between said vibrational displacements of the first and second vibratory systems for the optimum condition of said elliptical vibratory machine, said first vibratory system being self-excitedly vibrated at its resonant frequency and said second vibratory system being self-excitedly vibrated.

In accordance with a further aspect of this invention, an elliptical vibratory apparatus comprising;

(A) a variable frequency power source;

(B) a first vibratory exciter for generating a first vibrational force in the first direction, receiving an output of said variable frequency power source;

(C) a first vibratory system of an elliptical vibratory machine, receiving said first vibrational force in said first direction;

(D) vibrational displacement detecting means for detecting vibrational displacement of a movable part of said elliptical vibratory apparatus in said first direction;

(E) a phase shifter for receiving an output of said vibrational displacement detecting means;

(F) a power amplifier receiving an output of said phase shifter;

(G) a second vibratory exciter receiving an output of said power amplifier for generating a second vibrational force in the second direction to a perpendicular to said first direction;

(H) a second vibratory system of said elliptical vibratory apparatus receiving said second vibrational force in said second direction from said the second vibratory exciter, wherein said first vibratory system is driven at its resonant frequency with adjustment of said variable frequency power source and the phase angle of said phase shifter is so controlled that the movable part of said elliptical vibratory machine can be vibrated at the optimum vibrational condition.

In accordance with a still further aspect of this invention, an elliptical vibratory apparatus comprising:

(A) a first controller including at least a first phase shifter a first high gain amplifier and a first saturation element;

(B) a first power amplifier for power-amplifying an output of said first controller;

(C) a first vibratory exciter receiving an output of said first power amplifier for generating a first vibrational force in a first direction;

(D) a first vibratory system of an elliptical vibratory machine receiving said first vibrational force in the first direction from said first vibratory exciter;

(E) a first vibratory displacement detecting means for detecting the vibrational displacement of a movable part of said elliptical vibratory machine in said first direction;

(F) a second controller including at least a second phase shifter, a second high gain amplifier and a second saturation element;

(G) a comparator, the output of said second controller being supplied to one input terminal of said comparator;

(H) a second power amplifier for power amplifying an output of said comparator;

(I) a second vibratory exciter receiving an output of said second power amplifier for generating a second vibrationaly force in a second direction perpendicular to said first direction;

(K) a second vibratory displacement detecting means for detecting a vibrational displacement of a movable part of said elliptical vibratory machine in said second direction;

(L) an amplifier having a gain corresponding to an imaginary spring constant, receiving an output of said second vibratory displacement detecting means;

(M) a phase compensator receiving an output of said amplifier for compensating the phase lag of said second vibratory exciter;

(N) a first closed loop consists being formed by said a second power amplifier, said second vibratory exciter, said second vibratory system, said second vibratory displacement detecting means, said amplifier, said phase compensator and said comparator to which the output of said second vibratory displacement detecting means is fed-back;

(O) a second closed loop being formed by said first controller, said first power amplifier, said first vibratory exciter, said first vibratory system, said first vibratory displacement detecting means, wherein shift angles of said first and second phase shifters are so predetermined that there is a phase difference of 180 degrees between the output terminal of said second vibrational displacement detecting means and the input terminal of said first controller, when these terminals are cut off from each other, and a predetermined phase difference can be obtained between said vibrational displacements of the first and second vibratory systems for the optimum condition of said elliptical vibratory machine, said first and second vibratory systems being self-excitedly vibrated at its resonant frequency.

In accordance with a still further aspect of this invention, an elliptical vibratory apparatus comprising:

(A) a first controller including at least a first phase shifter a first high gain amplifier and a first saturation element;

(B) a first power amplifier for power-amplifying an output of said first controller;

(C) a first vibratory exciter receiving an output of said first power amplifier for generating a first vibrational force in a first direction;

(D) a first vibratory system of an elliptical vibratory machine receiving said first vibrational force in the first direction from said first vibratory exciter;

(E) a first vibratory displacement detecting means for detecting the vibrational displacement of a movable part of said elliptical vibratory machine in said first direction;

(F) a second controller including at least a second phase shifter, a second high gain amplifier and a second saturation element;

(G) a comparator, the output of said second controller being supplied to one input terminal of said comparator;

(H) a second power amplifier for power-amplifying an output of said comparator;

(I) a second vibratory exciter receiving an output of said second power amplifier for generating a second vibrationaly force in a second direction perpendicular to said first direction;

(K) a second vibratory displacement detecting means for detecting a vibrational displacement of a movable part of said elliptical vibratory machine in said second direction;

(L) an amplifier having a gain corresponding to an imaginary spring constant, receiving an output of said second vibratory displacement detecting means;

(M) a phase compensator receiving an output of said amplifier for compensating the phase lag of said second vibratory exciter;

(N) a first closed loop being formed by said second power amplifier, said second vibratory exciter, said second vibratory system, said second vibratory displacement detecting means, said amplifier, said phase compensator and said comparator to which the output of said second vibratory displacement detecting means is fed-back;

(O) a second closed loop being formed by said first controller, said first power amplifier, said first vibratory exciter, said first vibratory system, said first vibratory displacement detecting means, said second controller, said comparator, said second power amplifier, said second vibratory exciter and said second vibratory displacement detecting means, the output of said second vibratory displacement detecting means being fed-back negatively to said first controller, wherein shift angles of said first and second phase shifters are so predetermined that there is a phase difference of 180 degrees between the output terminal of said second vibrational displacement detecting means and the input terminal of said first controller, when these terminals are cut off from each other, and a predetermined phase difference can be obtained between said vibrational displacements of the first and second vibratory systems for the optimum condition of said elliptical vibratory machine, said first and second vibratory systems being self-excitedly vibrated at its resonant frequency.

In accordance with a still further aspect of this invention, an elliptical vibratory apparatus comprising:

(A) a variable frequency power source;

(B) a first vibratory exciter for generating a first vibrational force in the first direction, receiving an output of said variable frequency power source;

(C) a first vibratory system of an elliptical vibratory machine, receiving said first vibrational force in said first direction;

(D) first vibrational displacement detecting means for detecting vibrational displacement of a movable part of said elliptical vibratory apparatus in said first direction;

(E) a phase shifter for receiving an output of said first vibrational displacement detecting means;

(F) a comparator to which an output of said shifter is supplied at one input terminal;

(G) a power amplifier receiving an output of said comparator;

(H) a second vibratory exciter receiving an output of said power amplifier for generating a second vibrational force in the second direction to a perpendicular to said first direction;

(I) a second vibratory system of said elliptical vibratory apparatus receiving said second vibrational force in said second direction from said second vibratory exciter;

(J) a second vibratory displacement detecting means for detecting a vibrational displacement of a movable part of said elliptical vibratory machine in said second direction;

(K) an amplifier having a gain corresponding to an imaginary spring constant, receiving an output of said second vibratory displacement detecting means;

(L) a phase compensator receiving an output of said amplifier for compensating the phase lag of said second vibratory exciter;

(M) a closed loop being formed by said power amplifier, said second vibratory exciter, said second vibratory system, said second vibratory displacement detecting means, said amplifier, said phase compensator and said comparator to which the output of said second vibratory displacement detecting means is negatively fedback;

wherein said first and second vibratory systems are driven at the resonant frequency with adjustment of said variable frequency power source and the phase angle of said phase shifter is so controlled that the movable part of said elliptical vibratory machine can be vibrated at the optimum vibrational condition;

In accordance with a still further aspect of this invention, an elliptical vibratory apparatus comprising:

(A) a first controller including at least a first phase shifter a first high gain amplifier and a first saturation element;

(B) a first power amplifier for power-amplifying an output of said first controller;

(C) a first vibratory exciter receiving an output of said first power amplifier for generating a first vibrational force in a first direction;

(D) a first vibratory system of an elliptical vibratory machine receiving said first vibrational force in the first direction from said first vibratory exciter;

(E) a first vibratory displacement detecting means for detecting the vibrational displacement of a movable part of said elliptical vibratory machine in said first direction;

(F) a second controller including at least a second phase shifter, a second high gain amplifier and a second saturation element;

(G) a prefilter receiving an output of said second controller;

(H) a second power amplifier for power-amplifying an output of said prefilter;

(I) a second vibratory exciter receiving an output of said second power amplifier for generating a second vibrationaly force in a second direction perpendicular to said first direction;

(J) a second vibratory system of said elliptical vibratory machine receiving said second vibrational force in the second vibrational force in the second direction from said second vibratory exciter.

(K) a second vibratory displacement detecting means for second direction from said second vibratory exciter detecting a vibrational displacement of a movable part of said elliptical vibratory machine in said second direction;

(L) a closed loop being formed by said first controller, said first power amplifier, said first vibratory exciter, said first vibratory system, said first vibratory displacement detecting means, said second controller,said prefilter, said second power amplifier, said second vibratory exciter and said second vibratory displacement detecting means, the output of said second vibratory displacement detecting means being fed-back negatively to said first controller,wherein said prefilter consists of a notch filter for cutting the resonant frequency component and a band-pass filter for amplifying the frequency component higher by a few percentages than said resonant frequency, and shift angles of said first and second phase shifters are so predetermined that there is a phase difference of 180 degrees between the output terminal of said second vibrational displacement detecting means and the input terminal of said first controller, when these terminals are cut off from each other, and a predetermined phase difference can be obtained between said vibrational displacements of the first and second vibratory systems for the optimum condition of said elliptical vibratory machine, said first and second vibratory systems being self-excitedly vibrated at the resonant frequency.

In accordance with a still further aspect of this invention, an elliptical vibratory apparatus comprising:

(A) a first controller including at least a first phase shifter a first high gain amplifier and a first saturation element;

(B) a first power amplifier for power-amplifying an output of said first controller;

(C) a first vibratory exciter receiving an output of said first power amplifier for generating a first vibrational force in a first direction;

(D) a first vibratory system of an elliptical vibratory machine receiving said first vibrational force in the first direction from said first vibratory exciter;

(E) a vibratory displacement detecting means for detecting the vibrational displacement of a movable part of said elliptical vibratory machine in said first direction;

(F) a second controller including at least a second phase shifter, a second high gain amplifier and a second saturation element;

(G) a prefilter receiving an output of said second controller;

(H) a second power amplifier for power-amplifying an output of said prefilter;

(I) a second vibratory exciter receiving an output of said second power amplifier for generating a second vibrationaly force in a second direction perpendicular to said first direction;

(J) a second vibratory system of said elliptical vibratory machine receiving said second vibrational force in the second direction form said second vibratory exciter.

(L) a closed loop being formed by said first controller, said first power amplifier, said first vibratory exciter, said first vibratory system, said vibratory displacement detecting means, the output of said second vibratory displacement detecting means being fed-back negatively to said first controller, wherein said prefilter consists of a notch filter for cutting the resonant frequency component and a band-pass filter for amplifying the frequency component higher by a few percentages than said resonant frequency, and shift angles of said first and second phase shifters are so predetermined that there is a phase difference of 180 degrees between the output terminal of said vibrational displacement detecting means and the input terminal of said first controller, when these terminals are cut off from each other, and a predetermined phase difference can be obtained between said vibrational displacements of the first and second vibratory systems for the optimum condition of said elliptical vibratory machine, said first and second vibratory systems being self-excitedly vibrated at the resonant frequency.

In accordance with a still further aspect of this invention, an elliptical vibratory apparatus comprising:

(A) a variable frequency power source;

(B) a first vibratory exciter for generating a first vibrational force in the first direction, receiving an output of said variable frequency power source;

(C) a first vibratory system of an elliptical vibratory machine, receiving said first vibrational force in said first direction;

(D) vibrational displacement detecting means for detecting vibrational displacement of a movable part of said elliptical vibratory apparatus in said first direction;

(E) a phase shifter for receiving an output of said first vibrational displacement detecting means;

(F) a prefilter (G) a power amplifier receiving an output of said prefilter;

(H) a second vibratory exciter receiving an output of said power amplifier for generating a second vibrational force in the second direction to a perpendicular to said first direction;

(I) a second vibratory system of said elliptical vibratory apparatus receiving said second vibrational force in said second direction from said second vibratory exciter;

wherein said first and second vibratory systems are driven at the resonant frequency with adjustment of said variable frequency power source and the phase angle of said phase shifter is so controlled that the movable part of said elliptical vibratory machine can be vibrated at the optimum vibrational condition;

In accordance with a still further aspect of this invention, an elliptical vibratory apparatus comprising;

(A) a controller receiving vibration instruction;

(B) a comparator which is connected to said controller at its one input terminal;

(C) a power amplifier connected to an output terminal of said comparator;

(D) a vibratory exciter;

(E) a mechanical vibrational system receiving the vibrational force of said vibratory exciter;

(F) a vibration detecting means arranged adjacent to or attached to said mechanical vibrational system;

(G) an amplifier having a gain corresponding to an imaginary spring constant and receiving the output of said vibration detecting means;

(H) a phase compensator receiving the output of said amplifier and compensating the phase lag of said vibratory exciter;

(I) a first closed loop being formed by said comparator, said power amplifier, said vibratory exciter, said mechanical vibrational system, said vibration detecting means, said amplifier and said phase compensator in which the output of said vibration detecting means is negatively fed-back to another input terminal of said comparator;

(J) a second closed loop being formed by said vibration detecting means, said controller,said comparator, said amplifier, said vibratory exciter and said mechanical vibration system, in which the output of said vibration detecting means are negatively fed-back to said controller, wherein a self-excited vibration is obtained and an electrical or imaginary resonant frequency of the mechanical vibration system is rised by a frequency corresponding to said imaginary spring constant by the gain of said amplifier.

In accordance with a still further aspect of this invention, an elliptical vibratory apparatus comprising;

(A) a controller receiving vibration instruction;

(B) a comparator which is connected to said controller at its one input terminal;

(C) a power amplifier connected to an output terminal of said comparator;

(D) a vibratory exciter;

(E) a mechanical vibrational system receiving the vibrational force of said vibratory exciter;

(F) a vibration detecting means arranged adjacent to or attached to said mechanical vibrational system;

(G) an amplifier having a gain corresponding to an imaginary spring constant and receiving the output of said vibration detecting means;

(H) a phase compensator receiving the output of said amplifier and compensating the phase lag of said vibratory exciter;

(I) a closed loop being formed by said comparator, said power amplifier, said vibratory exciter, said mechanical vibrational system, said vibration detecting means, said amplifier and said phase compensator in which the output of said vibration detecting means is negatively fed-back to another input terminal of said comparator;

wherein a power source is connected to said controller to vibrate enforcedly said mechanical vibration system and an electrical or imaginary resonant frequency of the mechanical vibration system is rised by a frequency corresponding to said imaginary spring constant by the gain of said amplifier.

In accordance with a still further aspect of this invention, an elliptical vibratory apparatus comprising;

(A) a first controller;

(B) a first power amplifier;

(C) a first vibratory exciter;

(D) a first mechanical vibration system;

(E) a first vibration detecting means arranged adjacent to or, attached to said first mechanical vibration system, (F) a second controller receiving the detected output of said first vibration detecting means, (G) a comparator;

(H) a second power amplifier;

(I) a second mechanical vibratory system;

(J) a second vibration detecting means arranged adjacent to or, attached to said second mechanical vibration system;

(K) a first closed loop been formed by said first controller, said first power amplifier, said first vibratory exciter, said mechanical vibratory system, said first vibration detecting mean, said second controller, said comparator, said second power amplifier, said mechanical vibration system, said second vibration detecting means in which the detected output of said second vibration detecting means are negatively fed-back to said first controller, said first mechanical vibration system being self-excitedly vibrated and said second mechanical vibrational system being enforcedly vibrated;

(L) an amplifier receiving the output of said second vibration detecting means having a gain corresponding to an imaginary spring constant.

(M) a phase compensator for compensating the phase lag of said second vibratory exciter, receiving the output of said amplifier;

(N) a second closed loop being formed by said second vibrational detecting mean, said phase comparator and said comparator, second power amplifier, said second mechanical vibratory system in which the output of said phase compensation is negatively fed-back to said comparator, wherein the electrical (imaginary) resonant frequency of said second mechanical vibration system is raised by a frequency component corresponding to said imaginary spring constant.

In accordance with a still further aspect of this invention, an elliptical vibratory apparatus comprising;

(A) a first controller connected to a first electric power source;

(B) a first power amplifier;

(C) a first vibratory exciter;

(D) a first mechanical vibration system;

(E) a second controller connected to a second electric power source which is shifted in phase by a predetermined phase angle from said first electric power source;

(F) a comparator;

(G) a second power amplifier;

(H) a second vibratory exciter;

(I) a second mechanical vibration system;

(J) a vibration detecting means arranged adjacent to or attached to said second mechanical vibration system;

(K) an amplifier having a gain corresponding to a imaginary spring constant;

(L) a phase compensator, receiving the output of said amplifier and compensating a phase lag of said second vibratory exciter;

(M) a closed loop being formed by said vibration detecting means, said amplifier, said phase compensator and said comparator in which the output of said phase compensator or is negatively fed-back to said comparator, and the electrical (imaginary) resonant frequency of the second mechanical vibration system is raised by a frequency corresponding to said gain of the amplifier.

In accordance with a still further aspect of this invention, in an elliptical vibratory system, apparatus comprising;

(A) a power amplifier receiving vibrational instruction;

(B) a vibratory exciter receiving the output of said power amplifier and;

(C) a mechanical vibration system receiving the vibrational force from said vibratory exciter, said vibrational instruction is supplied through a prefilter to said power amplifier, said prefilter consisting of a notch filter for cutting the resonant frequency component of said mechanical vibration system and the band-pass filter for amplifying the frequency component higher by a few percentages than the actual resonant frequency of said the mechanical vibration system. The foregoing and other objects, features, and advantages of the present invention will be more readily understood upon consideration of the following detailed description of the preferred embodiments of the invention, taken in conjunction with the accompanying drawings.

DESCRIPTION OF THE PREFERRED EMBODIMENTS

Next, elliptical vibrational apparatus according to embodiments of this invention will be described with reference to the drawings.

Figure 1:
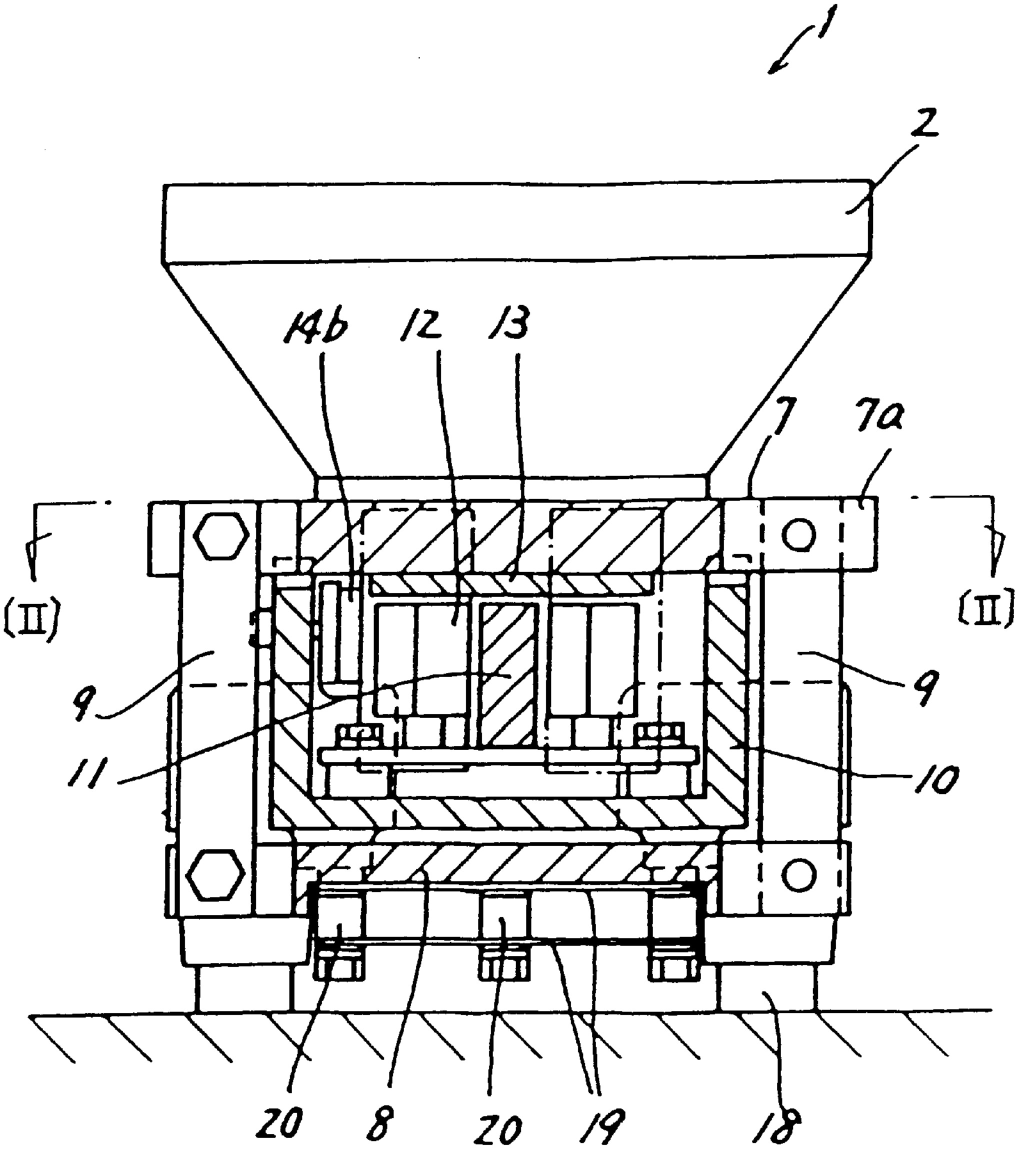
FIG. 1 PRIOR ART
FIG. 1 is a cross-sectional view of a vibratory parts-feeder of the Prior Art.
Figure 2:
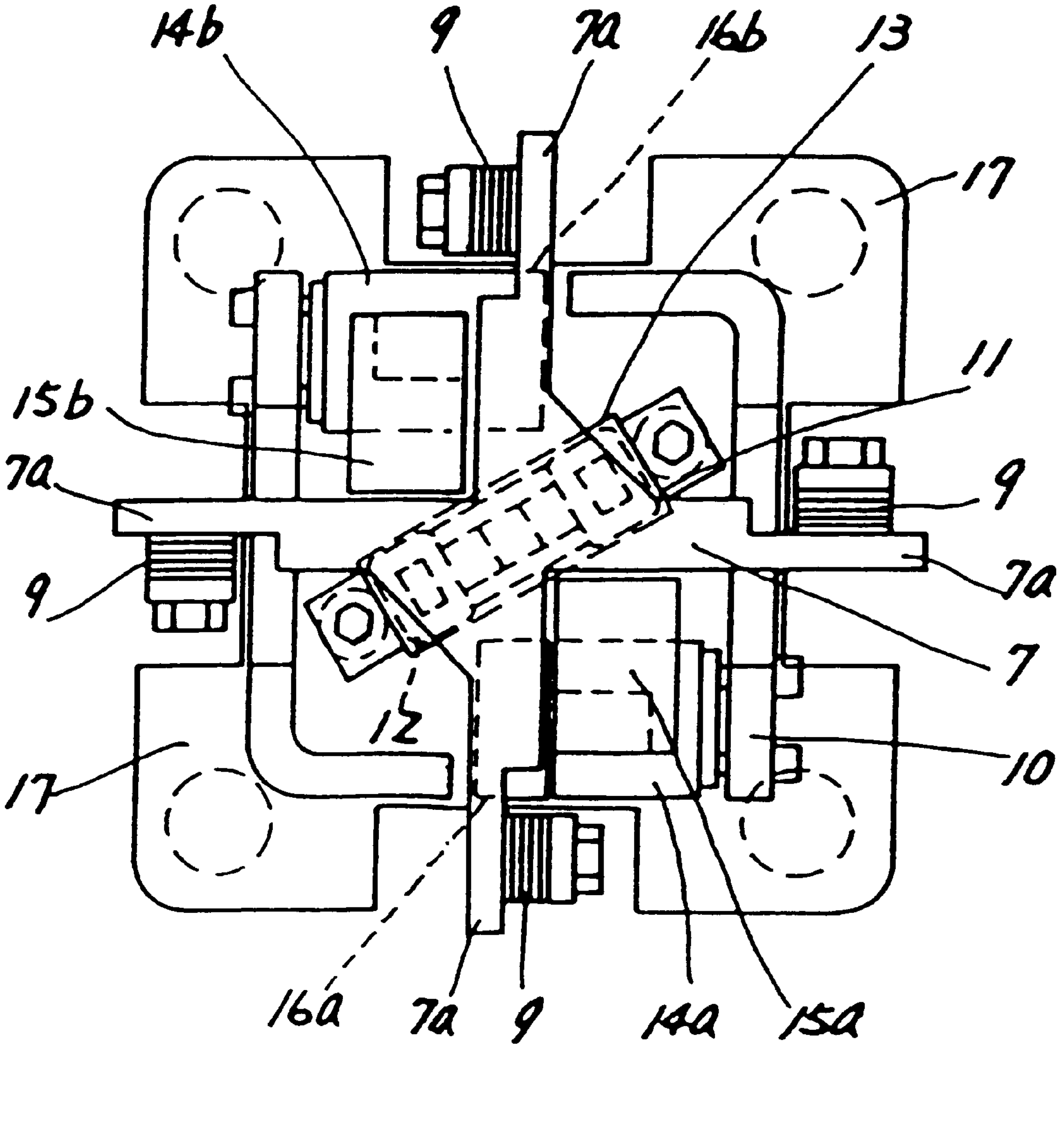
FIG. 2 is a plan view, taken along the line II—II in FIG. 1.
Figure 3:
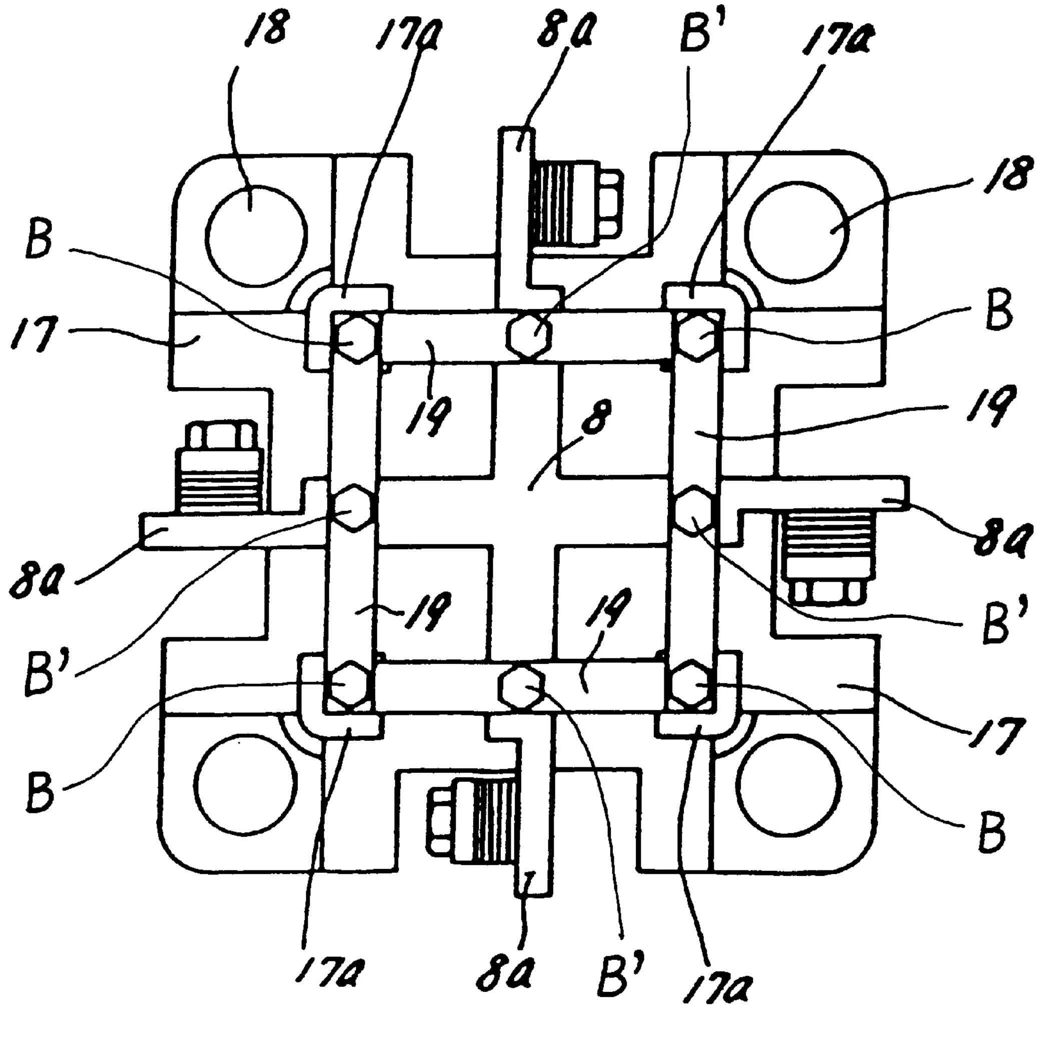
FIG. 3 is a bottom view of the above Prior Art.
Figure 4:
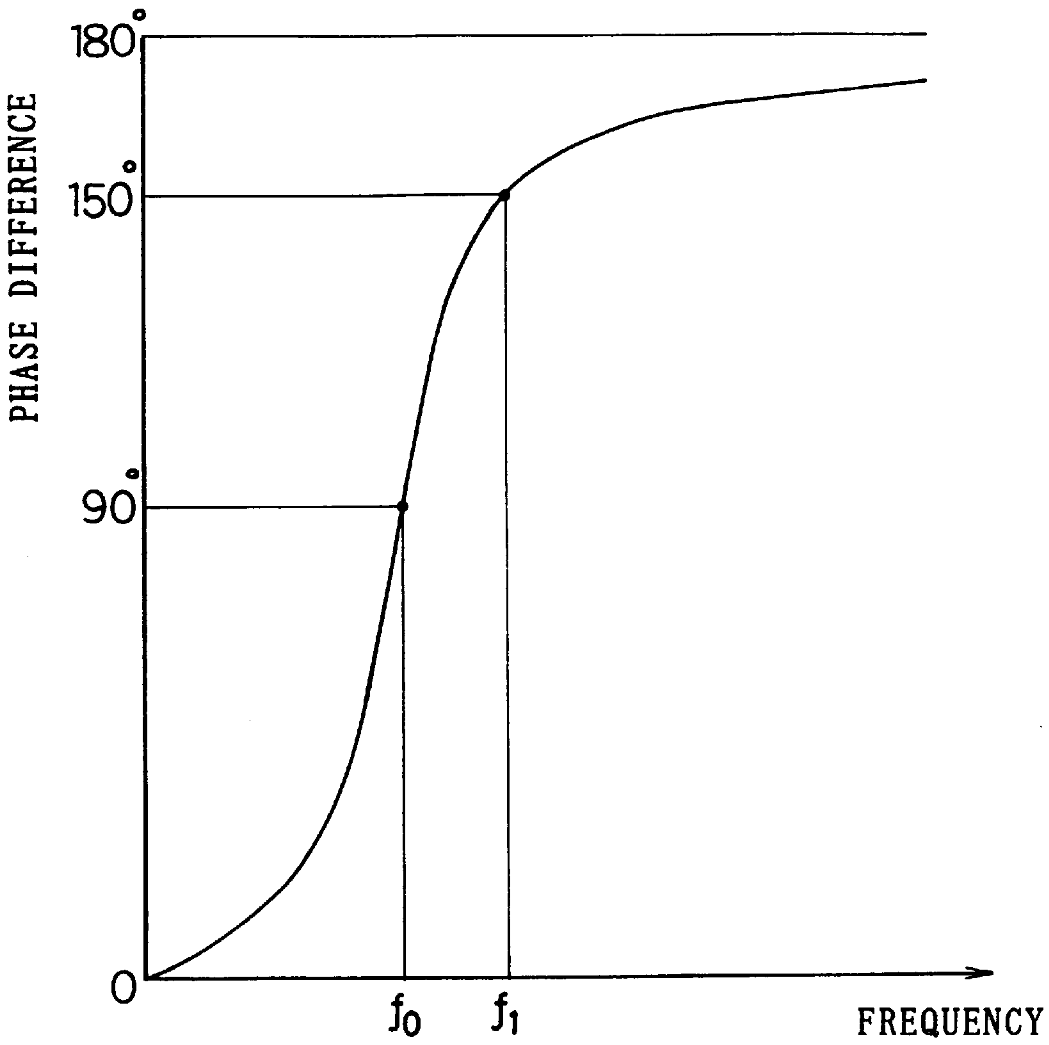
FIG. 4 is a chart for explaining the operation of the Prior Art.
Figure 5:
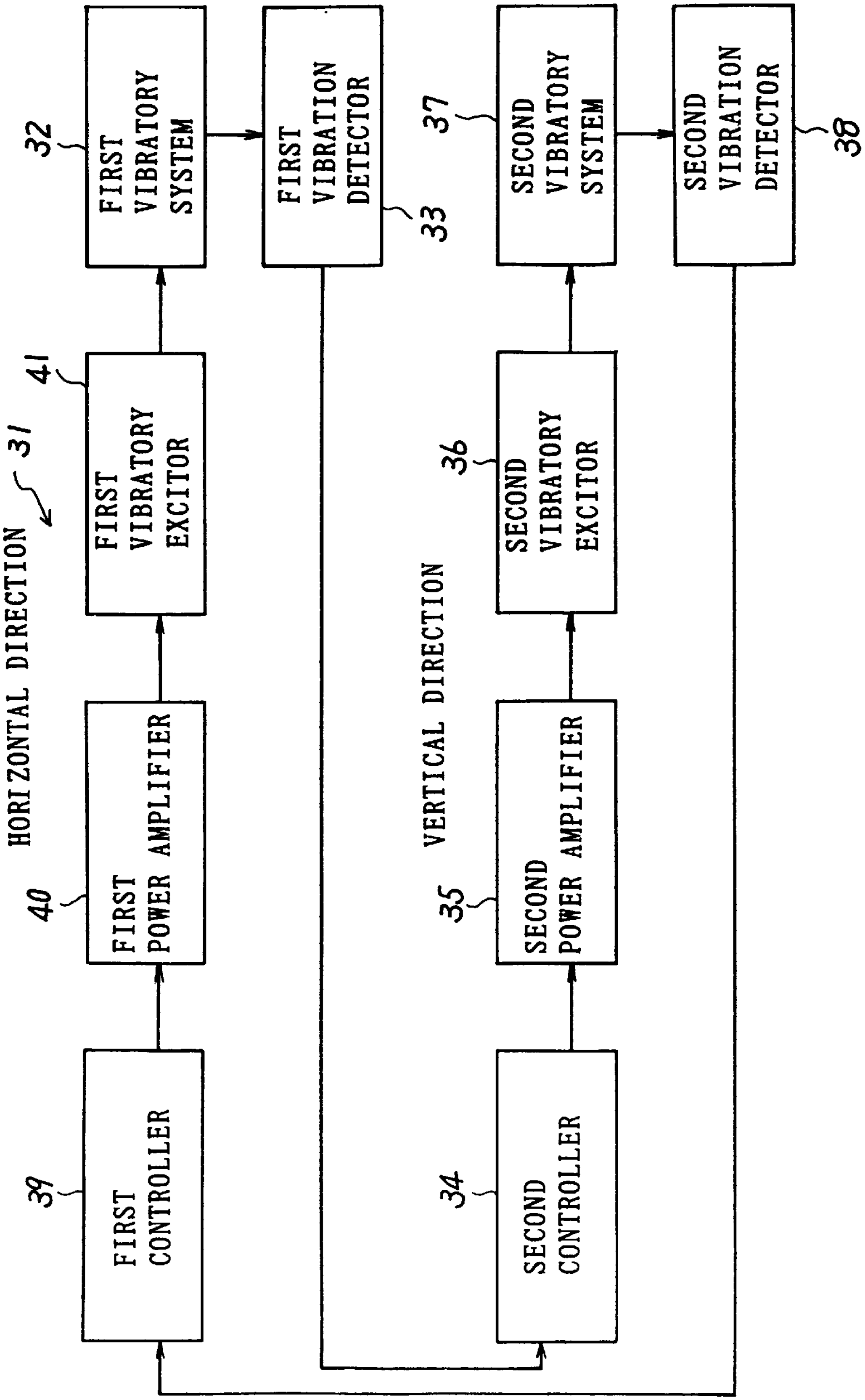
FIG. 5 is a block diagram of an elliptical vibratory apparatus according to a first embodiment of this invention.

FIG. 5 shows an elliptical vibratory apparatus according to a first embodiment of this invention. It is generally denoted by a reference numeral 31. A vibration displacement of a horizontal vibratory system or a first vibratory system 32 is detected by a first vibration detector 33 and an output terminal of the first vibration detector 33 is connected to a vertical vibratory system 37 through a vertical or second controller 34, a second power amplifier 35 and a second (vertical) vibration exciter 36. A vibratory displacement in the vertical direction is detected by a second vibration detector 38 and it is supplied to a horizontal (first, controller 39 and then through a first power amplifier 40 and horizontal (first) vibration exciter 41 to the horizontal vibratory system 32. The output of the first vibration detector 33 is supplied directly to the second controller 34, while the output of the horizontal (second) vibration detector 38 is negatively fed-back to the first controller 39.

Figure 6:
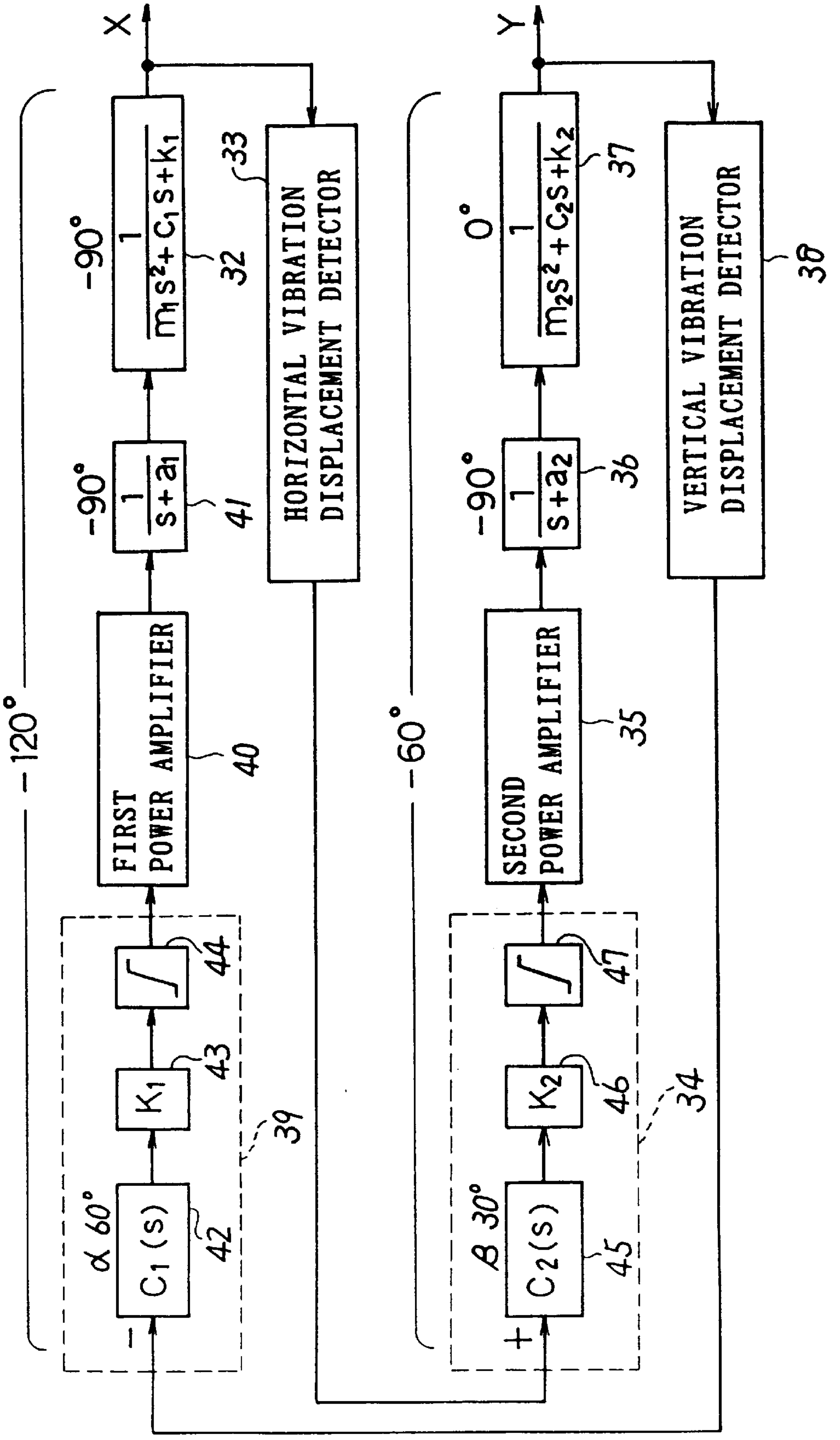
FIG. 6 is a block diagram of the details of the first embodiment.

FIG. 6 shows the detail of the first embodiment. Parts which correspond to those in FIG. 5, are denoted by the same reference numerals.

The first controller 39 consists of a first phase shifter 42, a first high gain amplifier 43 and a first limiter for adjustment of an amplitude, (saturation element) 44. The output of the first controller 39 is supplied to the power amplifier 40, and the amplified output is supplied to an electro-magnet 41 as the first vibratory exciter 41. The phase difference between the current and force is equal to an angle corresponding to a lag element of $1/(s+a_1)$, in the electro-magnet 41. The first vibratory system is vibrated by the output of the electro-magnet 41. The first vibratory system is represented by a characteristic equation, ($m_1s^2+c_1s+k_1=0$). Where $m_1$ represents mass of the bowl, $c_1$ represents a viscous coefficient and $k_1$ represents a spring constant in the horizontal direction.

The vibrational displacement in the horizontal direction is detected by the horizontal vibration displacement detector 33 and the detected output is supplied to the second controller 34. It consists of a second phase shifter 45, a second high gain amplifier 46 and a second limiter for adjustment of the amplitude (saturation limiter 47) as in the first controller 39. The output of the second controller 34 is supplied to the power amplifier 35 and the amplified output is supplied to a vertical electro-magnet 36 as the second vibration exciter. It has a lag element of $1/(s+a_2)$. The phase lag of 90 degrees occurs in the same manner as the first vibration exciter or horizontal electro-magnet 41. The vertical vibratory system 37 is vibrated by the electro-magnet 36. The vibratory displacement of the vibratory system 37 is detected by the vertical vibration displacement detector 38 and the output is supplied to the first controller 39 as a negative feedback signal.

According to this embodiment, one of the vibratory systems 32 and 37 is vibrated at the resonant frequency and another of them is vibrated at a frequency distant from the resonant frequency. The phase difference between the force and the displacement is equal to 90 degrees in the resonant vibration and the phase difference is nearly equal to zero in the vertical vibration system which is vibrated at the frequency distant from the resonant frequency. As above described, the electro-magnets 36 and 41 as the vibration exciters have the phase lag of 90 degrees. The advance phase $\alpha$ is equal to 60 degrees in the first phase shifter 42 according to this embodiment. The advance phase $\beta$ is equal to 30 degrees in the second phase shifter 45. There is the phase difference of 120 degrees between the input side of the first phase shifter 42 and the output side of the horizontal vibratory system 32.

And there is the phase difference of 60 degrees between the output side of the horizontal vibration detector 33 or the input side of the second phase shifter 45 and the output side of the second vibratory system 37. Accordingly, when the input side of the first controller 39 is cut out from the output side of the vertical vibration displacement detector 38, there is the phase difference of 180 degrees between the sides. Thus, the vibratory systems can be self-excitedly vibrated.

There have been described the constructions of the elliptical vibratory apparatus of the first embodiment of this invention. Next operations will be described.

Although not shown, a DC power source is connected through electric switches to the power amplifiers 35 and 40. By turning on the electric switches, the power amplifiers 35 and 40 are put into the operative condition. In the closed loop as shown in FIG. 6, the output of the vertical vibration displacement detector 38 is negatively fed-back to the first controller 39. When the input side of the first controller 39 is cut off from the output side of the vertical vibration displacement detector 38, there is the phase difference of 180 degrees. Accordingly the vibratory systems can be self-excitedly vibrated. Thus, the horizontal vibratory system can be vibrated at the resonant frequency. The horizontal vibrational displacement is detected by the horizontal vibration displacement detector 33 and the detecting output is supplied to the second controller 34 and is amplified by the second amplifier 35. The amplified output is supplied into the vertical electro-magnet 36. Accordingly, the vertical vibratory system 37 is self-excitedly vibrated. However the vibration frequency is distant from the horizontal resonant frequency by a few percentage. Since the horizontal vibratory system 32 is vibrated at the resonant frequency, the phase difference between the force and the displacement is maintained at 90 degrees. Further, the phase lag of the electro-magnet 41 is maintained at 90 degrees. The phase difference between the vibrations in the horizontal direction and vertical direction is maintained stably at the angle of 60 degrees. Accordingly, the bowl can be elliptically vibrated under the optimum condition. The parts to be handled, can be transported along the spiral track at the maximum transport speed in the bowl. Even when the voltage and frequency of commercial power supply fluctuate and the load of the parts in the bowl changes, the horizontal vibratory system can be self-excitedly oscillated or vibrated at the resonant frequency. The phase difference between the force and displacement is at the angle of 90 degrees. In the Prior. Art, even when the drive frequency of the vibratory system is shifted a little, the phase difference varies much from 90 degrees. According to this embodiment, the change is little. Accordingly, the optimum condition can be stably maintained.

Although not-shown, amplitude controllers receiving the output of the horizontal vibration displacement detector 33 and the output of the vertical vibration displacement detector 38 are connected to the limiters 44 and 47. The not-shown amplitude controllers include comparators, respectively. Predetermined amplitude voltages are applied to one input terminals of the comparator, and the outputs of the vibration displacement detectors 33 and 38 are connected to other input terminals of the comparators. In accordance with the difference, the amplitude adjustment limiters 44 and 47 are automatically adjusted. Accordingly, the amplitudes in the horizontal and vertical directions can be maintained at constants respectively. As the result, an elliptical vibration having constant longer axis and shorter axis can be imparted to the bowl.

Figure 7:
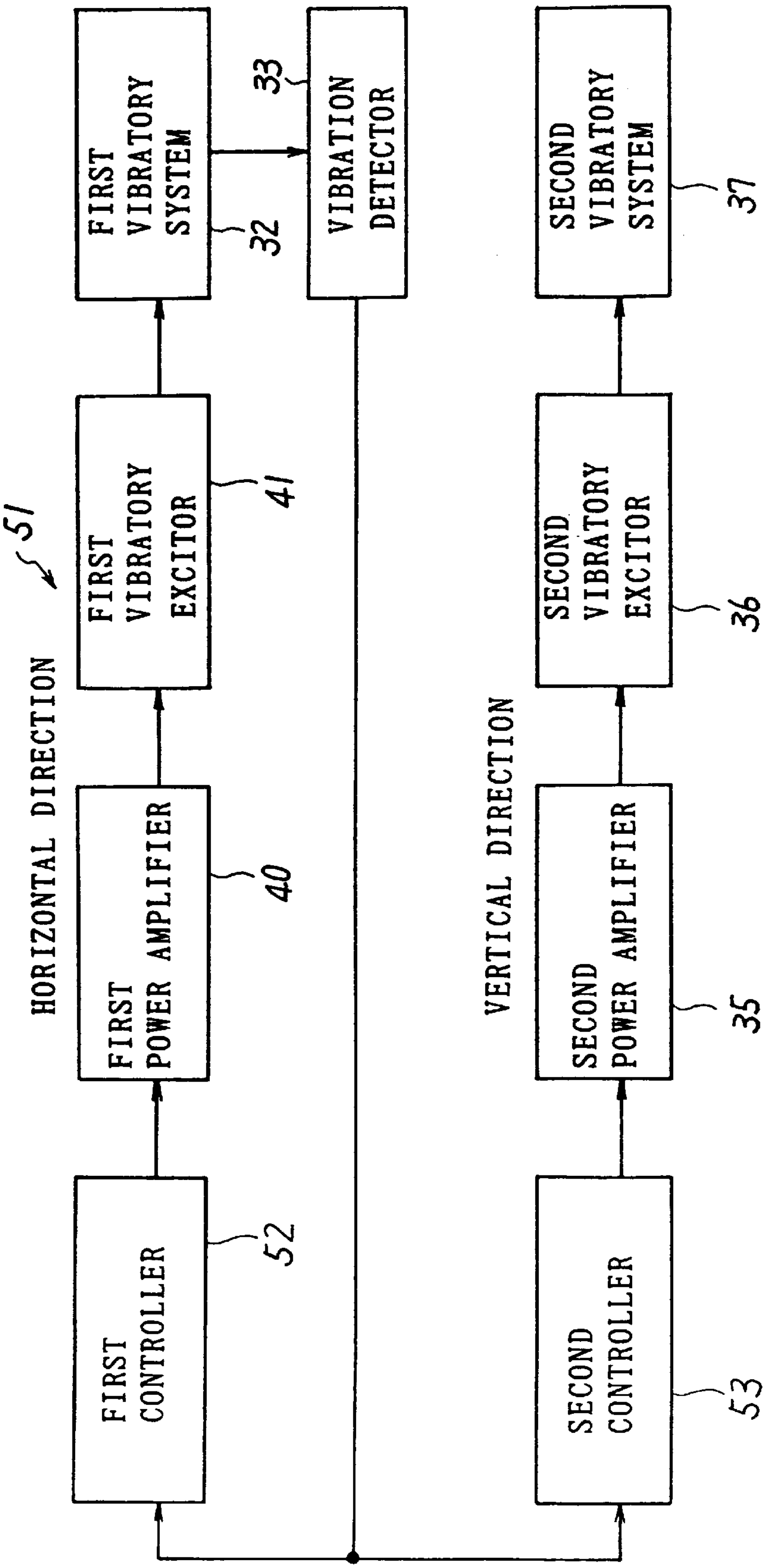
FIG. 7 is a block diagram of an elliptical vibratory apparatus according to a second of embodiment of this embodiment.
Figure 8:
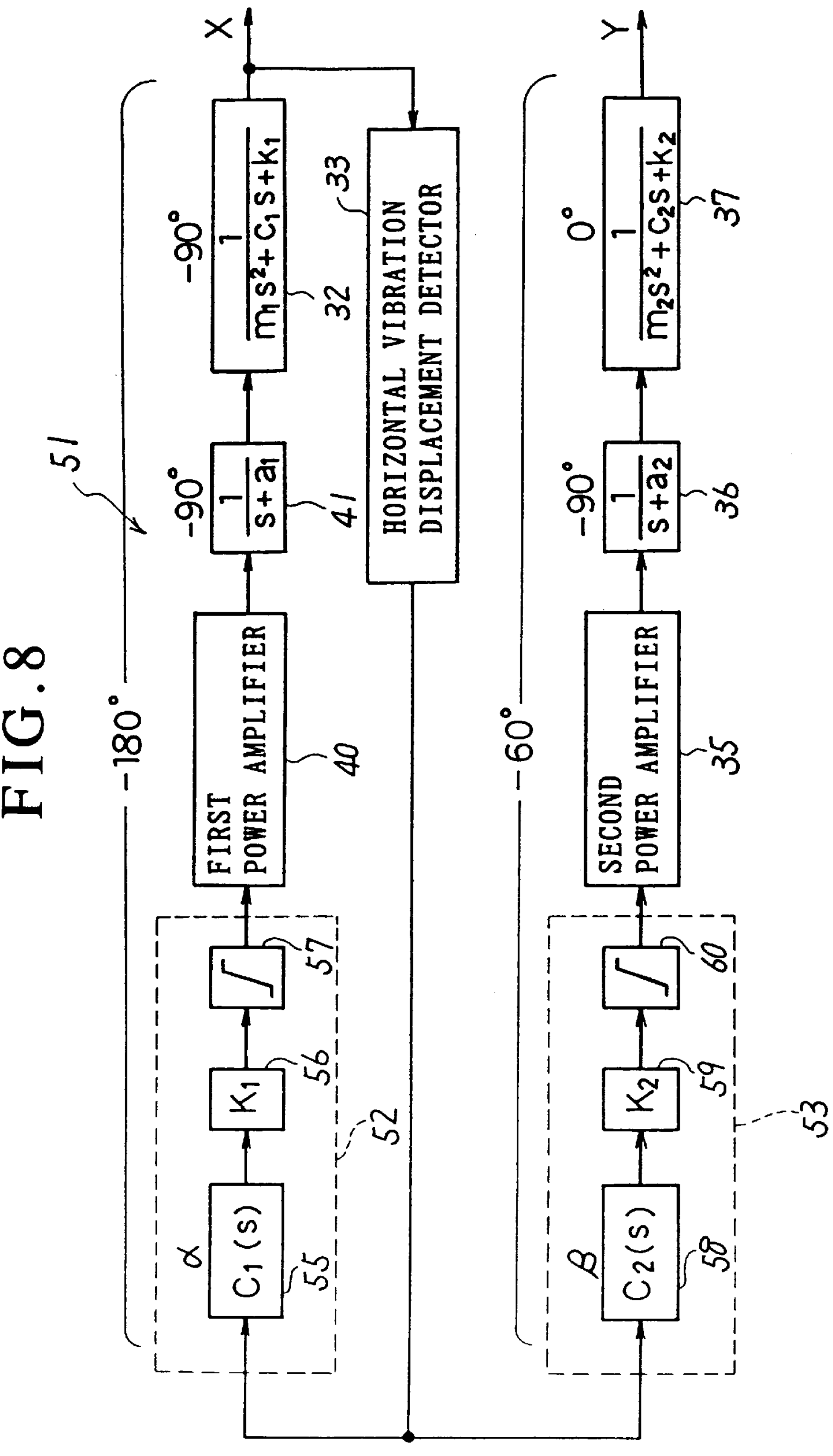
FIG. 8 is a block diagram of the detail of the second embodiment.

FIG. 7 and FIG. 8 show an elliptical vibratory apparatus according to a second embodiment of this invention. It is generally denoted by a reference numeral 51. Parts which correspond to those in the above embodiment, are denoted by the same reference numerals, the description of which will be omitted.

According to this embodiment, a closed loop is formed only in the horizontal vibratory system. The output of the horizontal vibration displacement detector 33 is negatively fed-back to the first controller 52 and is also supplied to the second (vertical) controller 53.

FIG. 8 shows the detail of the elliptical vibratory apparatus 51 according to this embodiment. The above embodiment and this embodiment are different from each other in the controllers 52 and 53. The controllers 52 and 53 consist of the phase shifters 55 and 58, high gain amplifiers 56 and, 59 and amplitude adjustment limiters 57 and 60, respectably. A set phase difference is equal to zero in the first phase shifter 55, while another set phase difference β is equal to 30 degrees in the second phase shifter 58. When the horizontal vibration displacement detector 33 is cut off from the first controller 52, there is the phase difference of 180 degrees between the cut terminals. And the phase difference between the output of the second vibratory system 37 and the input of the second controller 53 is equal to an angle of 60 degrees.

There have been described the constructions of the elliptical vibratory apparatus according to the second embodiment of this invention. Next, operations will be described.

In this embodiment, the closed loop is formed only in the horizontal vibratory system. There is the phase difference of 180 degrees between the output of the horizontal vibratory system 32 in the resonant frequency and the first controller 52. DC power sources are connected to the power amplifiers 35 and 40 through the not-shown electric switches. The horizontal vibratory system 32 is self-excitedly vibrated at the resonant frequency. And the vertical vibratory system 37 is enforcedly vibrated. The phase difference between the force and the displacement in the horizontal vibratory system, under the resonant condition, can be maintained at 90 degrees. Even when the drive frequency of the enforced vibration varies a little, the phase difference between the amplitude and the force change little. Accordingly, the phase difference can be maintained at 60 degrees between the vertical and horizontal vibrations. Accordingly, the optimum elliptical vibration can be obtained.

Figure 9:
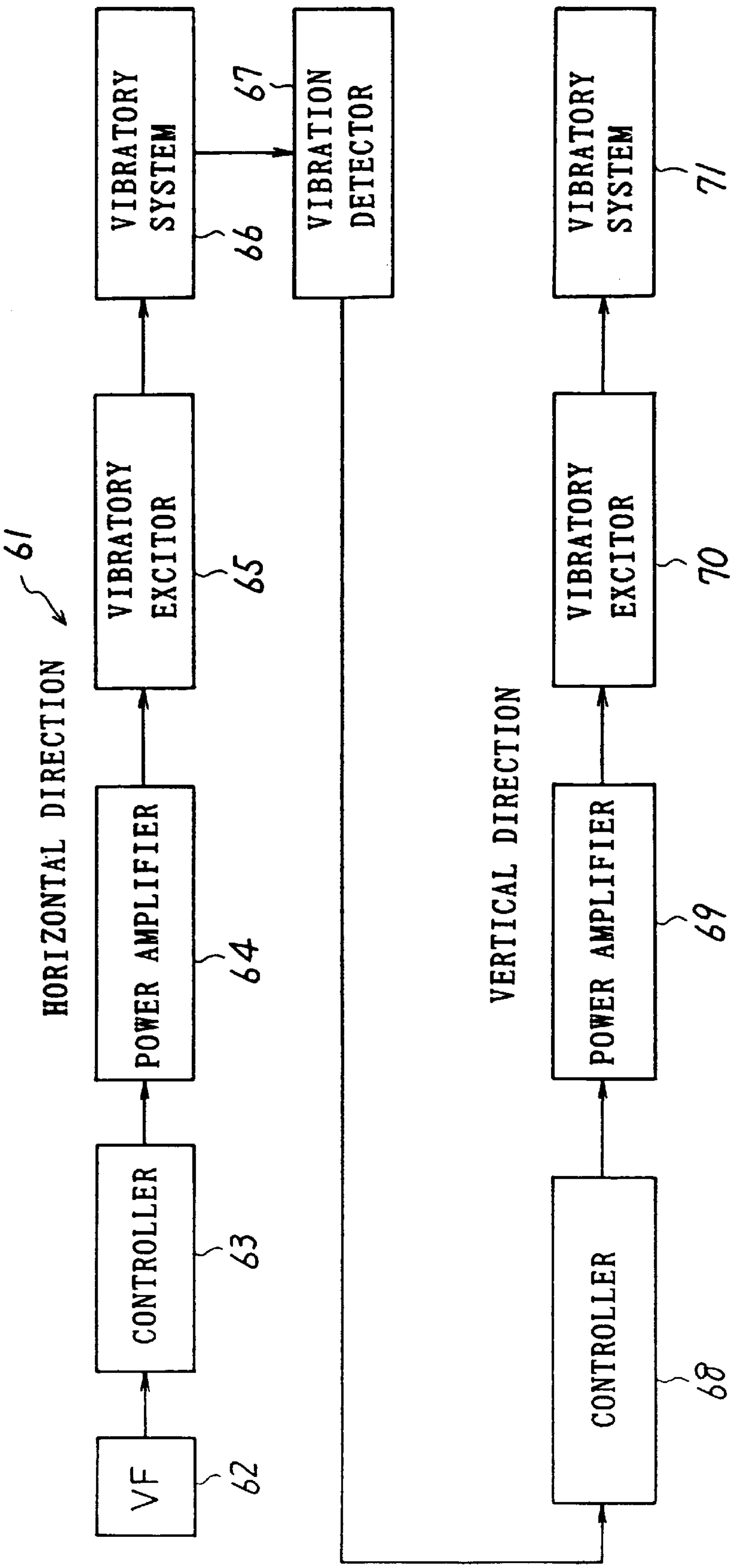
FIG. 9 is a block diagram of an elliptical vibratory apparatus according to a third embodiment of this invention.

FIG. 9 shows an elliptical vibratory apparatus according to a third embodiment of this invention. It is generally denoted by a reference numeral 61. An output of a variable frequency power source 62 is supplied to a first controller 63. Output is amplified by a first power amplifier 64 and the amplified output is supplied to an electro-magnet 65 as an electric-vibratory exciter. Thus, a horizontal vibratory system 66 is vibrated in the same manner as in the above embodiments. The horizontal vibrational displacement of the vibratory system 66 is detected by a vibration detector 67 and the detected output is supplied to a second controller 68 for the vertical vibration. The controlled output is supplied through a second power amplifier 69 to an electro-magnet 70 as a vibratory exciter. Thus, a second vibratory system 71 is vibrated. The shift phase angle in the second controller 68 is equal to 60 degrees. Accordingly, although the vibratory system 66 is vibrated at the resonant frequency by adjusting the variable frequency power source 62, the vibratory system 71 is vertically vibrated with a phase difference of 60 degree. Accordingly, when the variable frequency power source 62 is accurately adjusted, the horizontal vibratory system 66 is surely vibrated at the resonant frequency and the phase difference of 60 degrees can be securely maintained between vertical and horizontal vibratory systems 66 and 71. Thus, the optimum elliptical vibration can be obtained.

The controllers 63 and 68 do not include any saturation elements in contrast to the first and second embodiments. The output of the vibration detector 67 is supplied to a not-shown amplitude controller and the output is compared with a predetermined amplitude in the not-shown amplitude controller. The comparison result is supplied to the controller 63 and so a closed loop for constant amplitude is formed. The horizontal amplitude can be constant. In FIG. 9, there is not provided a vertical vibrational detecting means. However it may be arranged for obtaining a predetermined amplitude in the vertical direction.

Next, an elliptical vibratory apparatus according to a fourth embodiment of this invention will be described with reference to FIG. 10 to FIG. 12.

Figure 10:
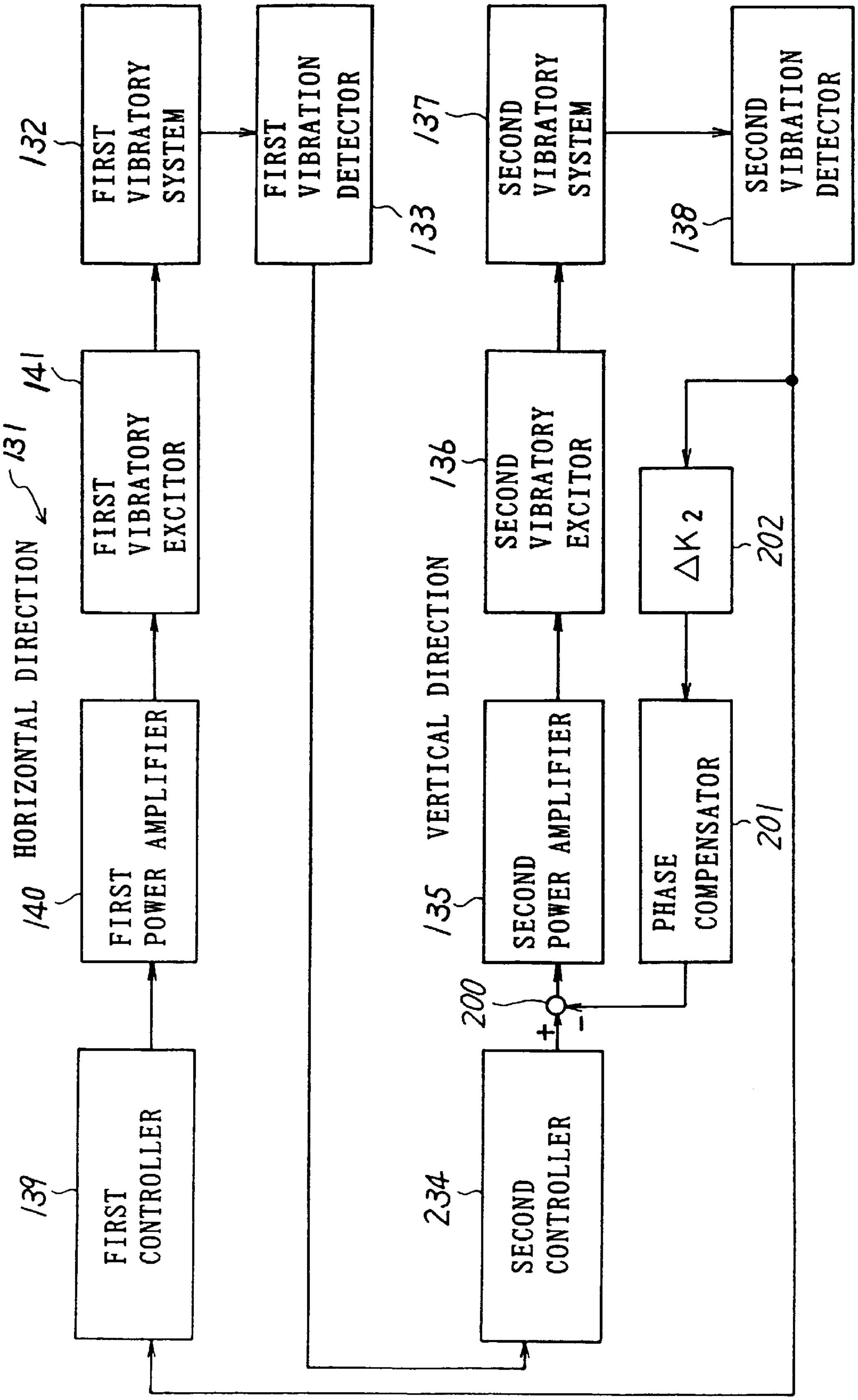
FIG. 10 is a block diagram of an elliptical vibratory apparatus according to fourth embodiment of this invention.

FIG. 10 shows an elliptical vibratory apparatus according to a fourth embodiment of this invention and it is generally denoted by a reference numeral 131. A vibrational displacement of a horizontal vibratory system 132 is detected by a vibration detector 133 and the output is supplied through a second controller 234, a comparator 200, a second power amplifier 135 and a second vibratory exciter 136 to a second vertical vibratory system 137. A vibrational displacement of the vertical vibratory system 137 is detected by a vibration detector 138 and the output is supplied to a first horizontal controller 139 and further the controlled output is supplied through a first power amplifier 140 and a first vibratory exciter 141 to a horizontal (first) vibratory system 132. The output of the vibrational detector 133 is directly supplied to the second controller 234, while the output of the vibration detector 138 is negatively fed-back to the first controller 139.

According to this embodiment, the output of the second vibrational detector 138 is supplied also to a gainΔ $k_2$ amplifier 202. The output is supplied through a phase compensator 201 to the comparator 200 as a negative signal. The output of the amplifier 202 is advanced by the phase lag in the phase compensator 201 which corresponds to the phase lag of the vibratory exciter 136. The Δ $k_2$ and the phase compensation of the phase compensator 201 will be hereafter in detail.

Figure 11:
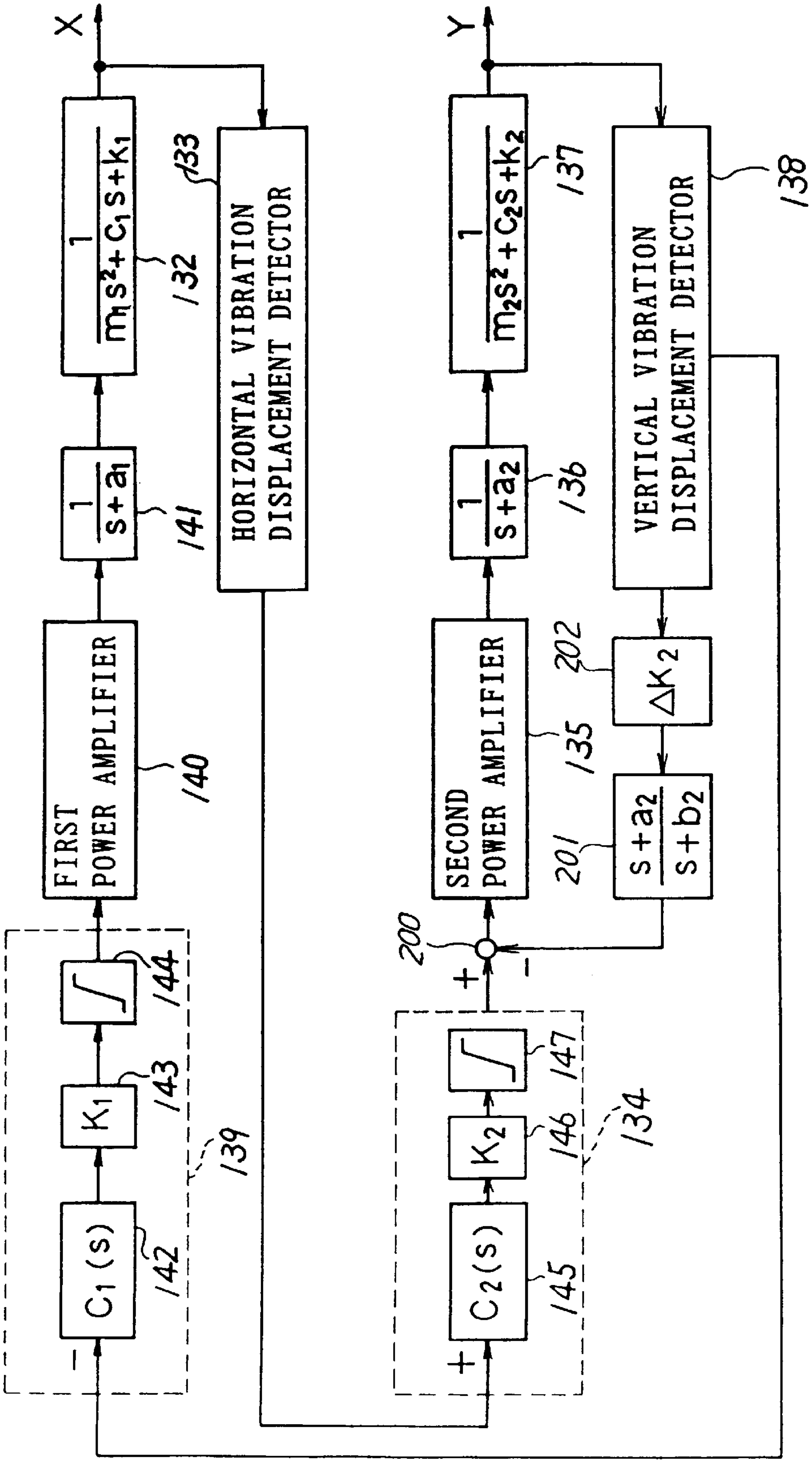
FIG. 11 is a block diagram of the detail of the fourth embodiment.

FIG. 11 shows a block diagram of this embodiment and parts which correspond to those in FIG. 10, are denoted by the same reference numerals.

The first controller 139 includes a first phase shifter 142, a first high gain amplifier 143 and a first amplitude adjusting limiter 144 which is the saturation element. The output of the first controller 139 is supplied to the first power amplifier 140. The amplified output is supplied to an electro-magnet 141 as the vibratory exciter. There is the phase difference of 90 degrees between the current and the force in the electro-magnet 141. It is a lag element of $1/(s+a_1)$. The horizontal vibratory system 132 is vibrated with the output of the electro-magnet 141. The first vibratory system 132 is represented by a characteristic equation, $(m_1s^2+c_1s+k_1=0)$. Where $m_1$ represents a mass of bowl, $c_1$ viscous coefficient, $k_1$ a spring constant in the horizontal direction. The vibration displacement of the horizontal vibratory system 132 is detected by the horizontal vibration displacement detector 133 and the output is supplied to the second controller 134. The second controller 134 includes the phase shifter 145, the high gain amplifier 146 and the amplitude adjustment limiter 147 which is the saturation element. The output is supplied to the comparator 200 and the comparison result is supplied to the second power amplifier 135. The amplified output is supplied to the vertical electro-magnet 136. It corresponds to a lag element, $1/(s+a_2)$. The phase lag of 90 degrees occurs in the vertical electro-magnet 136. The vertical vibratory system 137 is vibrated with the output of the vertical electro-magnet 136. The vibrational displacement of the vertical vibratory system 137 is detected by the vertical vibration displacement detector 138 and the detected output is negatively fed-back to the first controller 139.

According to this embodiment, the output of the vertical vibration displacement detector 138 is supplied also to the gain amplifier 202 having a gainΔ $k_2$. The vertical vibratory system 137 is represented by a characteristic equation, ($m_2s^2+c_2s+k_2=0$). The value of the gainΔ $k_2$ is so designed as to be larger by a few percentages than the spring constant $k_2$. Next, the detail of the vertical vibratory system 137 will be described.

Figure 12:
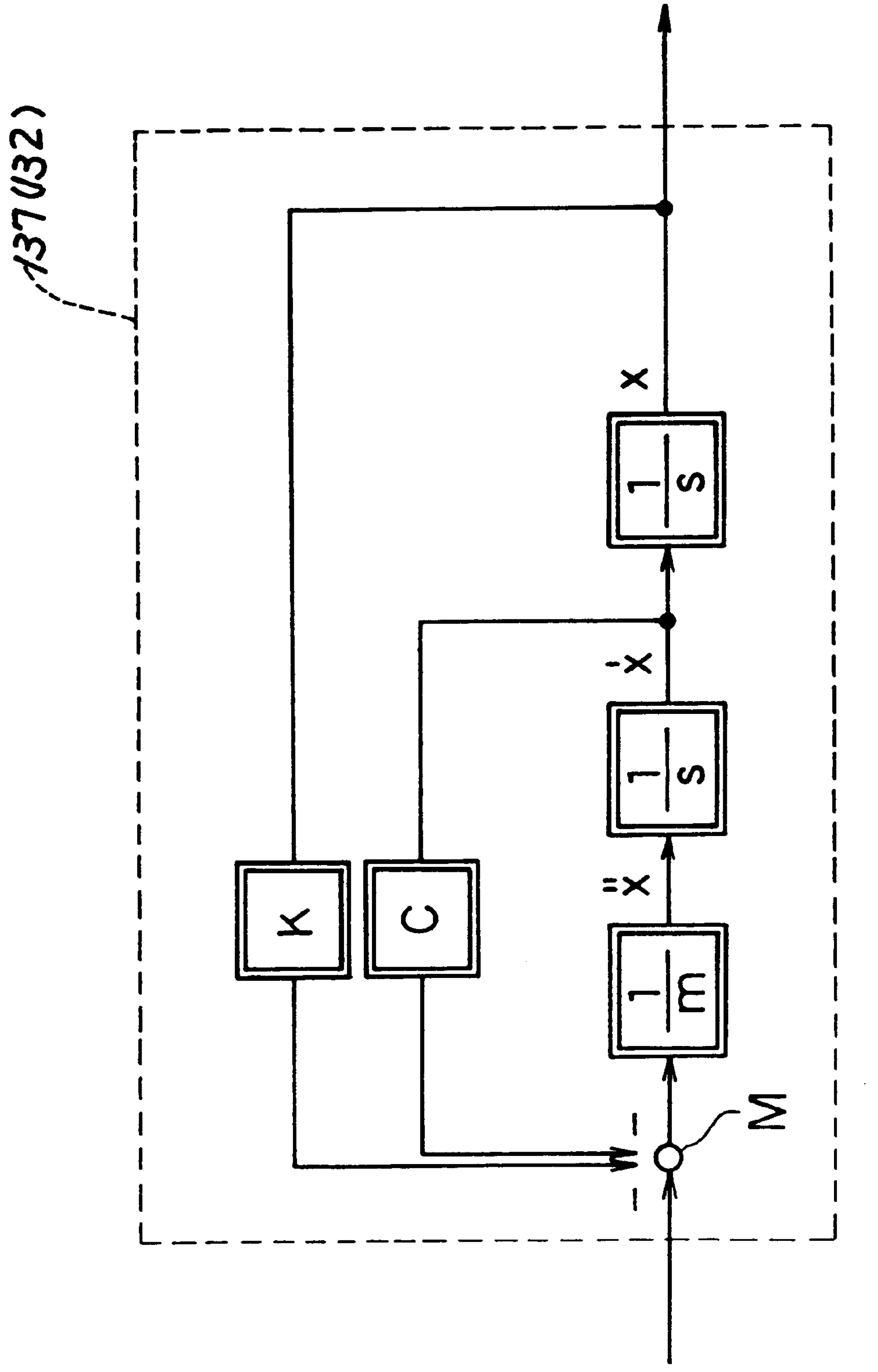
FIG. 12 is a block diagram of an important part of the fourth embodiment.

As shown in FIG. 12, the acceleration, $dx^2/dt^2$ of the movable part M which is a bowl in the vibratory parts feeder, is obtained by dividing the force applied to the movable part M by m which is the mass of the movable part M and then, the Laplace transformer s is multiplied with the acceleration, $dx^2/dt^2$. Accordingly, the velocity "dx/dt" is obtained. The viscous coefficient c is multiplied with the value, dx/dt. Thus, a resisting force against the movable part M can be obtained. It is negatively fed-back to the movable part M. The Laplace transformer, 1/s is multiplied with the detected dx/dt and so a displacement, x is calculated. A spring constant k is multiplied with the displacement x. The resisting force kx by the spring force is negatively fed-back to the movable part M.

As clear from, the vibrational technology, the resonant frequency is proportional to $(k_2/m_2)2/2$. According to this embodiment, the value $k_2$ is electrically converted. In other words, the gainΔ $k_2$ corresponds to the spring constant $k_2$. Accordingly, the resonant frequency of the vertical vibration system 137 is electrically raised by a few percentages. The electro-magnet 136 makes the phase lag. The phase advance element of $(s+a_2)/(s+b_2)$ $(b_2>a_2)$ is connected to the circuit for compensating the phase lag of the electro-magnet 136 and it is negatively fed-back to the comparator 200.

According to this embodiment, the vibratory systems 132 and 137 are self-excitedly oscillated and so the phase difference between the force and displacement is equal to 90 degrees. The force to the vertical vibratory system 137 lags by a predetermined phase angle behind the horizontal vibratory system 132. As above described, the phase lags of the electro-magnets 136 and 141 as the vibratory exciters are equal to 90 degrees. The phase is advanced by 60 degrees in the first phase shifter 142. On the other hand, the phase is advanced by 30 degrees in the second phase shifter 145. There is the phase difference of 120 degrees between the input side of the first phase shifter 142 and the output side of the horizontal vibratory system 132. And there is the phase difference of 60 degrees between the output of the horizontal vibration displacement detector 133 or the input side of the second phase shifter 145 and the output of the second vibratory system 137. Accordingly, when the input side of the first controller 139 and the output side of the vertical vibration displacement detector 138 for the vertical vibratory system is cut off, there is the phase difference of 180 degrees between both sides. Thus, the horizontal and vertical vibratory system 132 and 137 can be self-excitedly oscillated.

There has been described construction of the elliptical vibratory system according to the fourth embodiment of this invention. Next operation will be described.

Although not shown, electric switches are connected to the power amplifiers 135 and 140. With the closing of the electric switches, the power amplifiers 135 and 140 are put into the operative condition. In the closed loop as shown in FIG. 11, the output of the vibration detector 138 of the vertical vibratory system 137 is negatively fed-back to the first controller 139. Accordingly, when the closed loop is cut off, there is the phase difference of 180 degrees between both of the terminals. Thus, the horizontal and vertical vibratory systems 132 and 137 can be self-excitedly vibrated at the resonant frequency. As the vibrational displacement of the horizontal vibratory system 132 is detected by the vibration detector 133 and the detected output is supplied through the second controller 134, the comparator 200, the power amplifier 135 to the vertical electro-magnet 136. The vertical vibratory system 137 is driven with the output of the vertical electro-magnet 136. On the other hand, the horizontal vibratory system 132 is self-excitedly oscillated at the resonant frequency. Accordingly, the phase difference between the force and displacement can be maintained at 90 degrees. The phase lag of the electro-magnet 141 is maintained at 90 degrees. Accordingly, the phase difference between the horizontal and vertical vibrations can be maintained at 60 degrees.

According to this invention, the characteristic equation of the vertical vibratory system 137 is represented as the equation ($m_2s^2+c_2s+k_2=0$) in FIG. 11. The gain Δ $k_2$ of the amplifier 202 is equal to the value higher than by few percentages the mechanical spring constant in the vertical vibratory systems 137. The output detected by the vibrational displacement detector 138 is amplified by the gain amplifier 202 and it is supplied through the phase compensator 201 to the comparator 200. The phase lag is compensated in the phase compensator 201, which corresponds to the phase lag of the vertical electro-magnet 136. Thus, the mechanical resonant frequency of the vertical vibratory system 137 is not changed, however, the electrical resonant frequency rises up by few percentages corresponding to Δ $k_2$. Accordingly, even when the voltage of the power source fluctuates, and the, viscous coefficient and spring constant of the vibratory system 137 charge, by which the mechanical resonant frequency of vibratory system changes, the phase difference between the vertical and horizontal displacements does not change. When the negative feedback loop is not provided as in the Prior Art, the phase difference between the force and the displacement is much shifted from the phase difference $\pi/2$, and so the set phase difference between the horizontal and vertical vibrations is shifted much from the set value of 60 degrees. However, according to this invention, since the electric (imaginary) resonant frequency is higher by a few percentages than the mechanical resonant frequency, the phase difference varies little. Accordingly, the phase difference between the horizontal and vertical vibrations can be stably maintained at the angle of 60 degrees. Thus, the bowl can be always vibrated under the optimum condition.

In the optimum condition of the bowl, the parts can be transported along the spiral track of the bowl at the maximum transport speed. Even when the power source fluctuates or the load of the parts varies, the horizontal vibratory system can be always vibrated at the resonant frequency. The phase difference can be maintained at 90 degrees between the force (current) and the displacement. In the Prior Art, when the drive frequency of the vibratory system is even a little shifted from the resonant point, the phase difference is shifted much from the angles of 90 degrees. According to this embodiment, the vertical vibratory system is vibrated at the same frequency as the horizontal vibratory system and the imaginary resonant frequency of the vertical vibratory system is so designed as to be higher by a few percentages than resonant frequency of the vertical vibratory system. Accordingly, both of the vertical and horizontal vibratory systems can be vibrated at the resonant frequency.

Even when the power source fluctuates and load to the movable part varies to change the resonant frequency, the phase difference between the horizontal and vertical vibrations can be maintained at the optimum conditioned value.

Although not-shown, amplifier controllers are connected to the amplitude adjustment limiters 144 and 147, and receive the outputs of the horizontal and vertical vibration detector 133 and 138, respectively. They include comparators. Predetermined amplitudes are supplied to one input terminals of the comparators and the outputs of the vibration detector 133 and 138 are supplied to another input terminals. With the differences between the outputs of the vibration detectors 133 and 138, and the predetermined amplitudes, the amplitude adjustment limiters 144 and 147 are automatically adjusted and so the amplitudes of the vertical and horizontal vibrations can be maintained at the predetermined amplitudes, respectively. Thus, the elliptical vibration having predetermined longer axis and shorter axis, can be imparted to the bowl.

Figure 13:
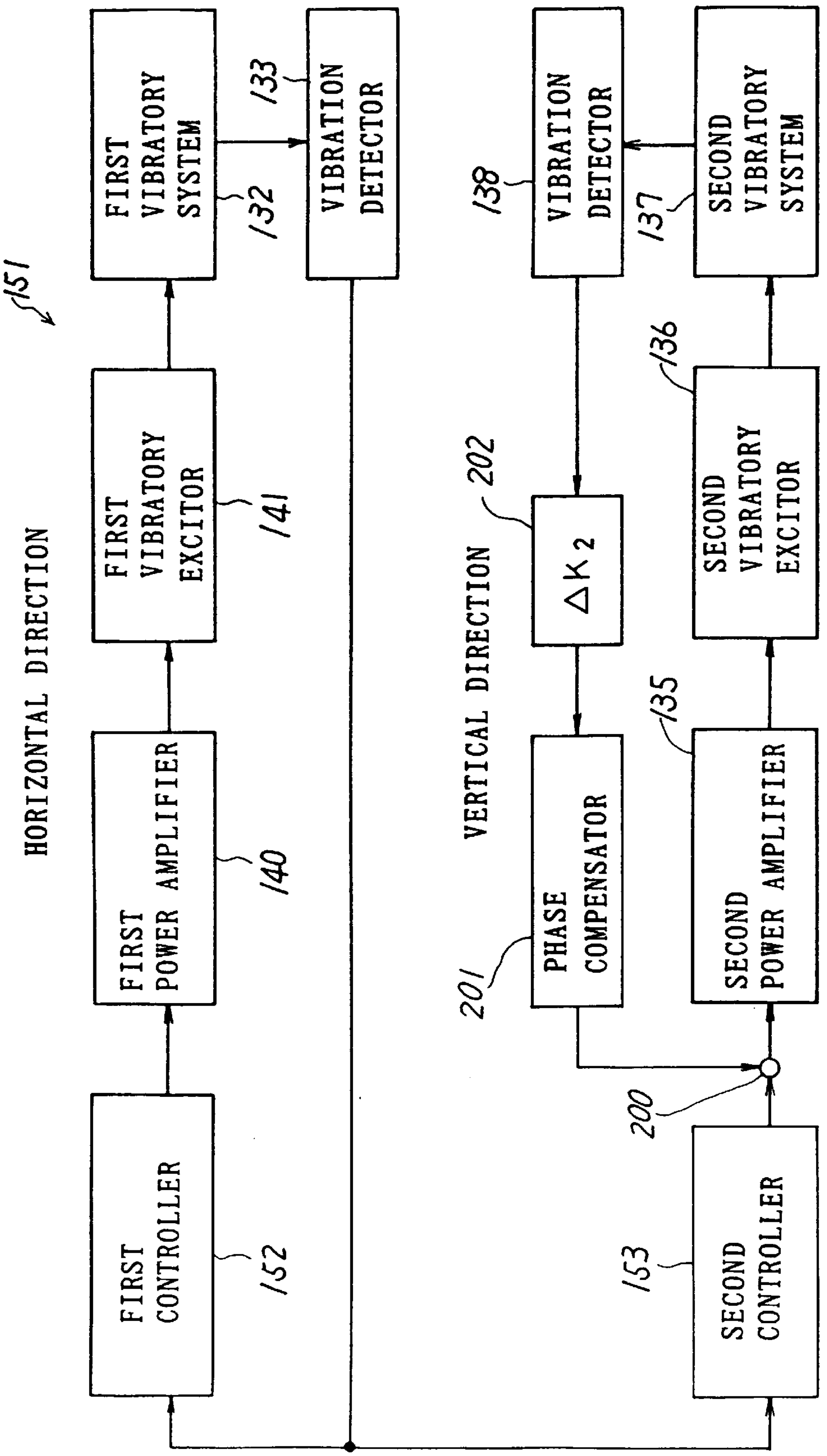
FIG. 13 is a block diagram of an elliptical vibratory apparatus according to a fifth embodiment of this invention.
Figure 14:
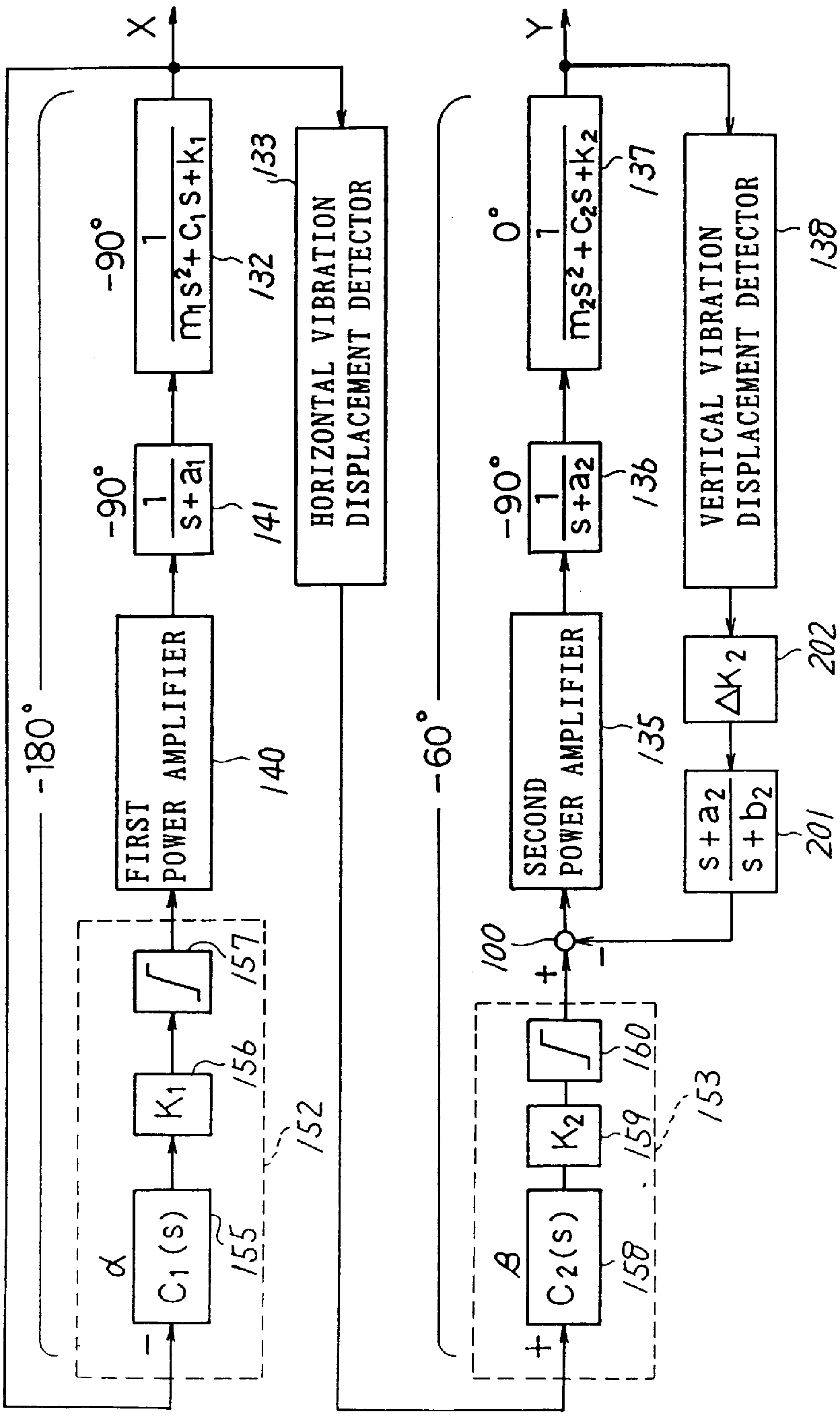
FIG. 14 is a block diagram of the detail of the fifth embodiment.

FIG. 13 and FIG. 14 show an elliptical vibratory apparatus according to a fifth embodiment of this invention. It is generally denoted by a reference numeral 151. Parts which correspond to those in the above embodiment, are denoted by the same reference numerals, the details of which will be omitted.

According to this embodiment, a closed loop for self-excitation is formed only in the horizontal vibratory system. The output of the horizontal vibration displacement detector 133 is negatively fed-back to the first controller 152. And it is further supplied to the second or vertical controller 153. Also in this embodiment, the output of the vibrational displacement detector 138 for detecting the displacement of vertical vibration is amplified by the amplifier 202 having the gain $\Delta k_2$ for the above described purpose and the output is supplied through the phase compensator 201 to the comparator 200.

FIG. 14 shows the details of the fifth embodiment. The controllers 152 and 153 include phase shifters 155 and 158, high gain amplifiers 156 and 159, and amplitude-adjustment limiters 157 and 160. A phase difference $\alpha$ is set in the first phase shifter 155, and it is equal to 0°, while a phase difference $\beta$ is set in the second phase shifter 158 and is equal to 30 degrees. Accordingly, when the output of the horizontal vibration displacement detector 133 and the first controller 152 are cut off from each other, there is a phase difference of −180 degrees. Further, there is a phase difference of −60 degrees between the output of the second vibratory systems 137 and the input of the second controller 153.

There has been described construction of the elliptical vibratory apparatus according to the fifth embodiment of this invention. Next, operations will be described.

Only the horizontal vibratory system is looped in this embodiment. There is the phase difference of 180 degrees between the output of the horizontal vibratory system 132 and the first controller 152. Although not shown, DC electrical power sources are connected through electric switches into the power amplifiers 135 and 140. Thus, the horizontal vibratory system 132 is self-excitedly vibrated at the resonant frequency and the vertical vibratory system 137 can be also vibrated at the resonant frequency. The phase difference between the forces and the displacements both in the horizontal and vertical vibrational systems can be obtained to be 90 degrees. Even when the resonant frequency is shifted a little from the phase difference between the displacement and force in the vertical vibratory system, it changes little by function of the gain amplifier 202. Thus, the phase difference can be obtained to be the angle of 60 degrees between the horizontal and vertical directions. Thus, the optimum elliptical vibrational condition can be obtained.

Figure 15:
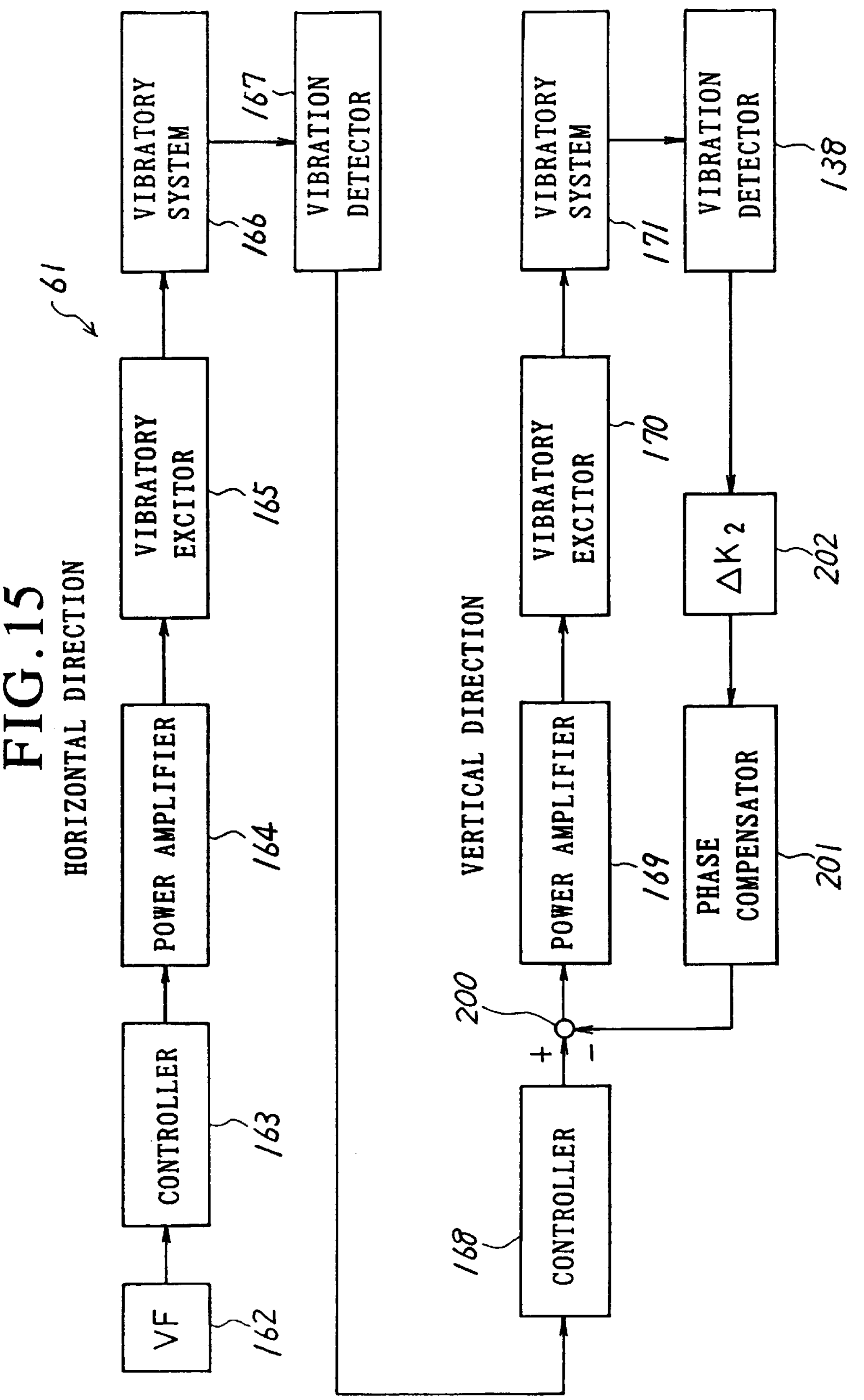
FIG. 15 is a block diagram of an elliptical vibratory apparatus according to a sixth embodiment of this invention.

FIG. 15 shows an elliptical vibratory system according to a sixth embodiment of this invention. It is generally denoted by a reference numeral 61. An output of a variable frequency power source 162 is supplied to the first controller 163. An output of the first controller 163 is amplified by an power amplifier 164. The amplified output is supplied to an electro-magnet 165 as a vibratory exciter. The horizontal vibratory system 166 is excited by the output of the electro-magnet 165. The vibrational displacement of the horizontal vibratory system 166 is detected by a vibration detector 167 and the detected output is supplied to a second controller 168 for the vertical vibration. The controlled output is supplied to one input terminal of the comparator 200 and a negative feedback signal is supplied to another input terminal of the comparator 200. A closed loop is formed by a power amplifier 169, a vibratory exciter 170, a vertical vibratory system 171, a vibrational displacement detector 138 and the gain amplifier 202 and the phase compensator 201. The output of the phase shifter 201 is negatively fed-back to the comparator 200. The second vibratory system 171 is driven with the output of the vibratory exciter 171. The phase difference is set at the angle of 60 degree in the second controller 168. Accordingly, when the horizontal vibratory system 166 is accurately and resonantly vibrated with the adjustment of the variable frequency power source 162, the phase difference between the horizontal and vertical vibrations can be maintained accurately at the angle of 60 degrees. If the variable frequency power source 162 is accurately adjusted, the phase difference is securely maintained at the angle of 60 degrees and so the optimum elliptical vibration can be obtained.

In contrast to the above embodiments, the controllers 163 and 168 are not provided with any saturation element. Although not shown, a closed loop is formed for constant amplitude. Thus, the amplitude of the horizontal vibration may be constant. The vertical vibratory system 171 is vibrated at the resonant frequency. The electrical or imaginary resonant frequency of the vertical vibratory system 171 is risen by a few percentage of the mechanical resonant frequency. The closed loop for that purpose consists of the amplifier 169, the vibration exciter 170, the vibration system 171, the detector 138, the gain$\Delta K_2$ amplifier 202 and the phase compensator 201. Another closed loop is formed for constant amplitude. Thus, the amplitude of the horizontal vibration is maintained at constant. The vertical vibratory system 171 is resonantly vibrated also. The electrical or imaginary resonant frequency of the vertical system 171 is risen by a few percentages, of the mechanical resonant frequency by the closed loop which consists of the amplifier 202, the phase shifter compensator 201 etc. Even when the load to the movable part and the voltage of the electric power source fluctuate, the phase difference are varied little.

Figure 16:
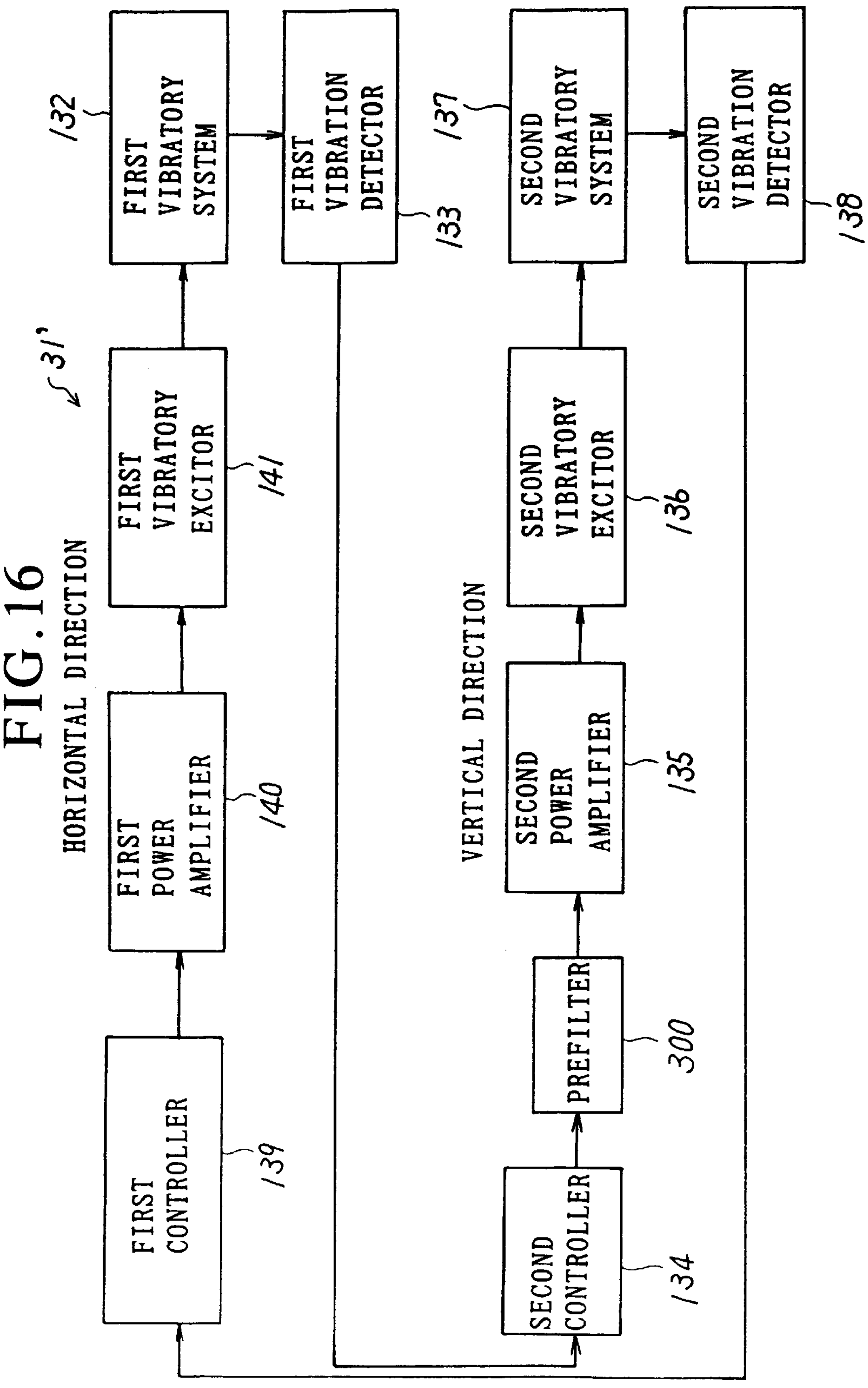
FIG. 16 is a block diagram of an elliptical vibratory apparatus according to a seventh embodiment of this invention.

FIG. 16 shows an elliptical vibratory system according to a seventh embodiment of this invention. It is denoted generally denoted by a reference numeral 31'. The parts which correspond to those in the above embodiments, are denoted by the same reference numerals, the details of which will be omitted.

Figure 19:
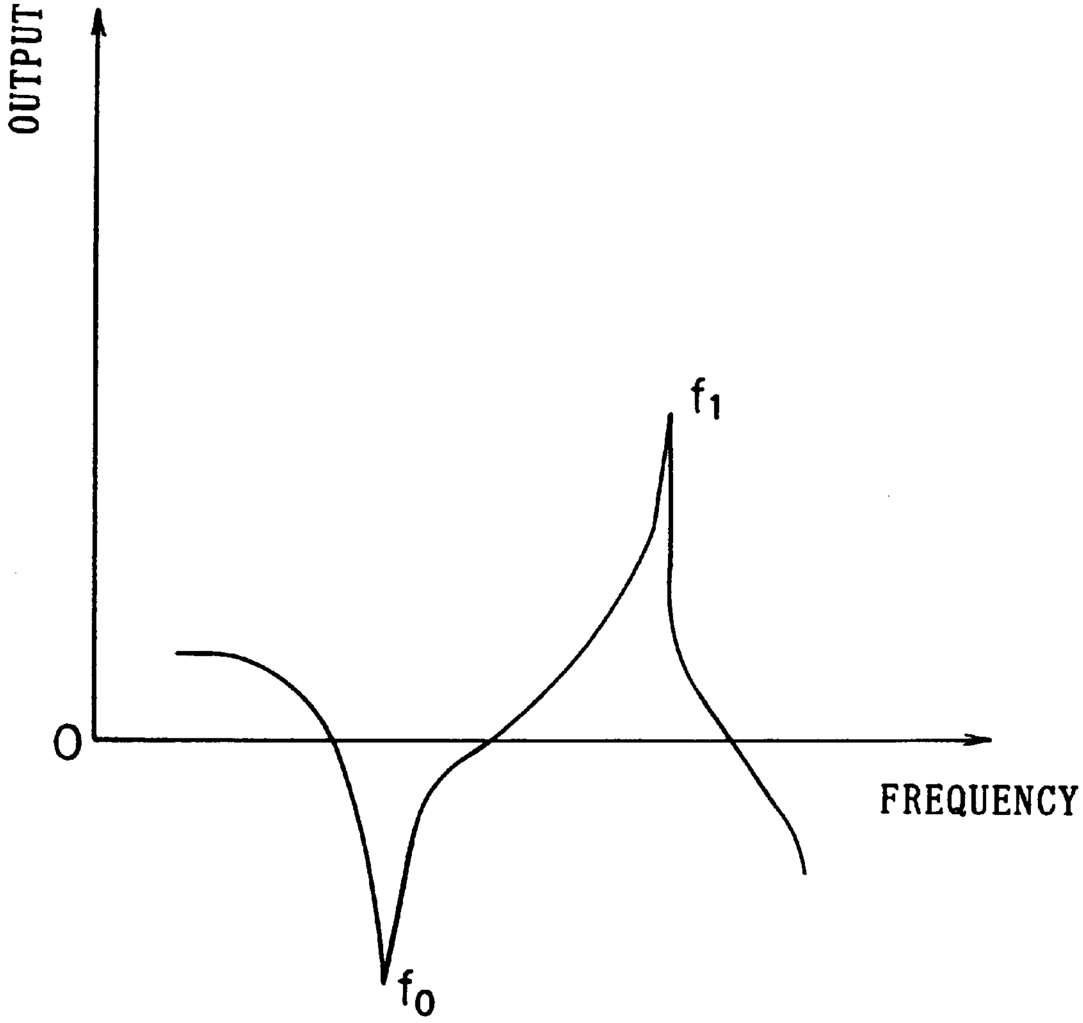
FIG. 19 is a chart for explaining operation of the ninth embodiment.
Figure 20:
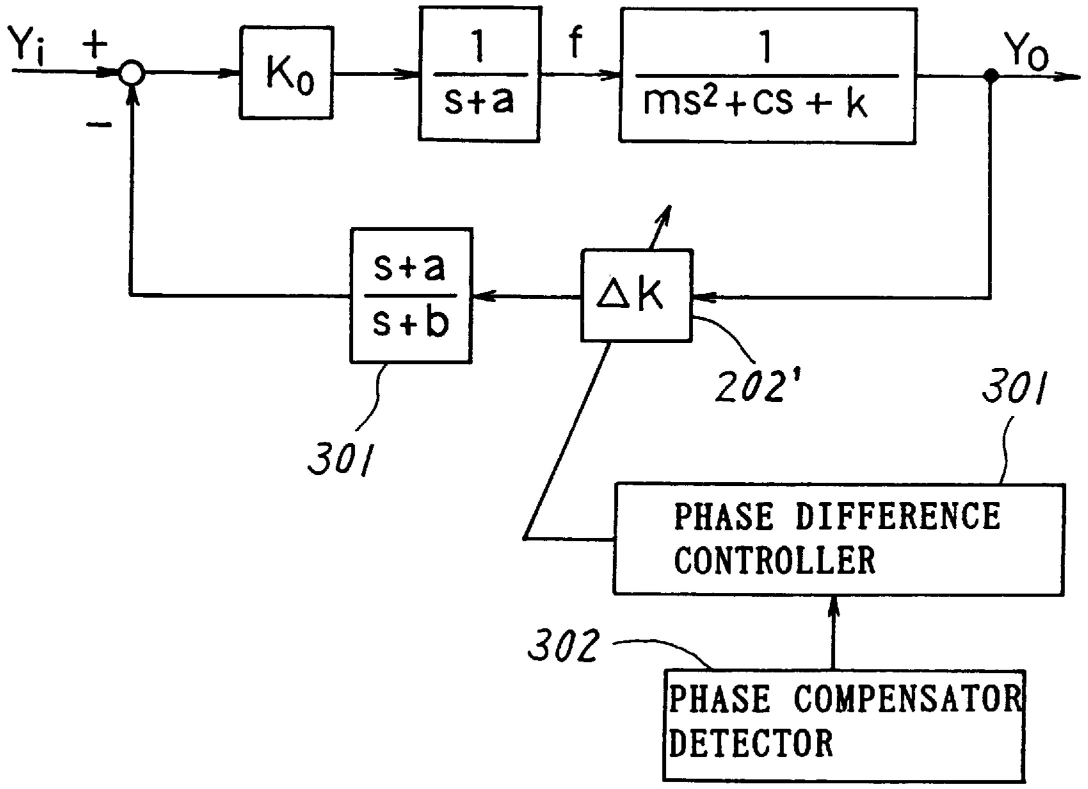
FIG. 20 is a block diagram of an important part of an elliptical vibratory apparatus according to a tenth embodiment of this invention.

The closed loop including the$\Delta k$ gain amplifier 202 and the phase compensator 201 provided in the sixth embodiment, is omitted in this embodiment. Instead, a prefilter 300 is connected between the controller 134 and the power amplifier 135. The characteristic equation of the prefilter 300 is represented by $(m_2s^2+c_2s+k_2)/(m_2s^2+c_2s+k_2+\Delta k_2)$ In this equation, $(m_2s^2+c_2s+k_2)$ is a characteristic equation of the vertical vibratory system. This characteristic equation represents a notch component filter for cutting the resonant frequency $f_0$ as shown FIG. 19. The spring constant consists of a mechanical constant $k_2$ and an imaginary spring constant $\Delta k_2$ in the other characteristic equation. Accordingly, the imaginary resonant frequency $f_1$ is higher than the mechanical resonant frequency, by$\Delta k_2$. Thus, the prefilter 300 functions as a band pass filter for passing through the waves of the frequency higher by few percentages of the mechanical resonant frequency $f_0$. Accordingly, the prefilter 200 consists of the notch filter for cutting the mechanical resonant frequency and the band-pass filter for passing through the frequency which is higher by few percentages than the mechanical resonant frequency. With the prefilter 300, the vertical vibrational displacement instruction is given by the characteristic equation, $(m_2s^2+c_2s+k_2)$. Actually, the vertical vibratory system is vibrated at the resonant frequency, however, when the mechanical resonant frequency is varied, for example, with the change of the load to the bowl, the phase difference is varied much. However in this embodiment, the electrical resonant frequency is so designed as to be higher than the mechanical resonant frequency, as above described. The phase angles are set in the first and second phase controllers 142 and 145. The phase angle between the horizontal vibration displacement and the vertical vibrational displacement is maintained at the angle of 60 degrees. Thus, the optimum elliptical vibration can be obtained. Any other functions and effects of this embodiment can be the same as in above embodiments.

Figure 17:
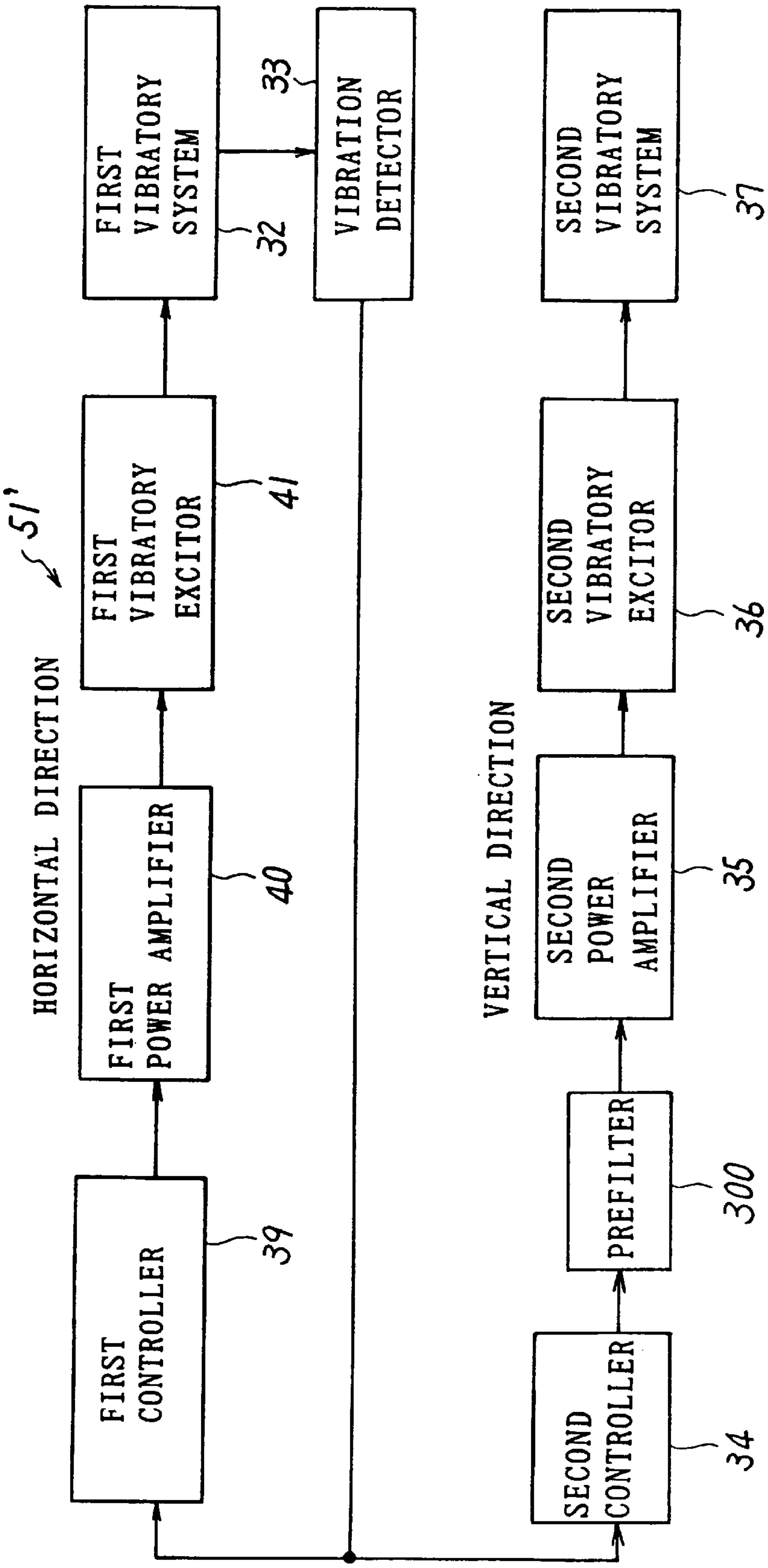
FIG. 17 is a block diagram of an elliptical vibratory apparatus according to an eighth embodiment of this invention.

FIG. 17 shows an elliptical vibrational apparatus 51' according to an eighth embodiment of this invention. Parts which correspond to those in the above embodiments, are denoted by the same reference numerals, the detail of which will be omitted. Also in this embodiment, the closed loop including the gain amplifier 202 and the phase compensator 201 are omitted. Instead, the prefilter 300 is arranged also as in the seventh embodiment. The prefilter 300 of this embodiment has the similar function and effect as those of the seventh embodiment.

Figure 18:
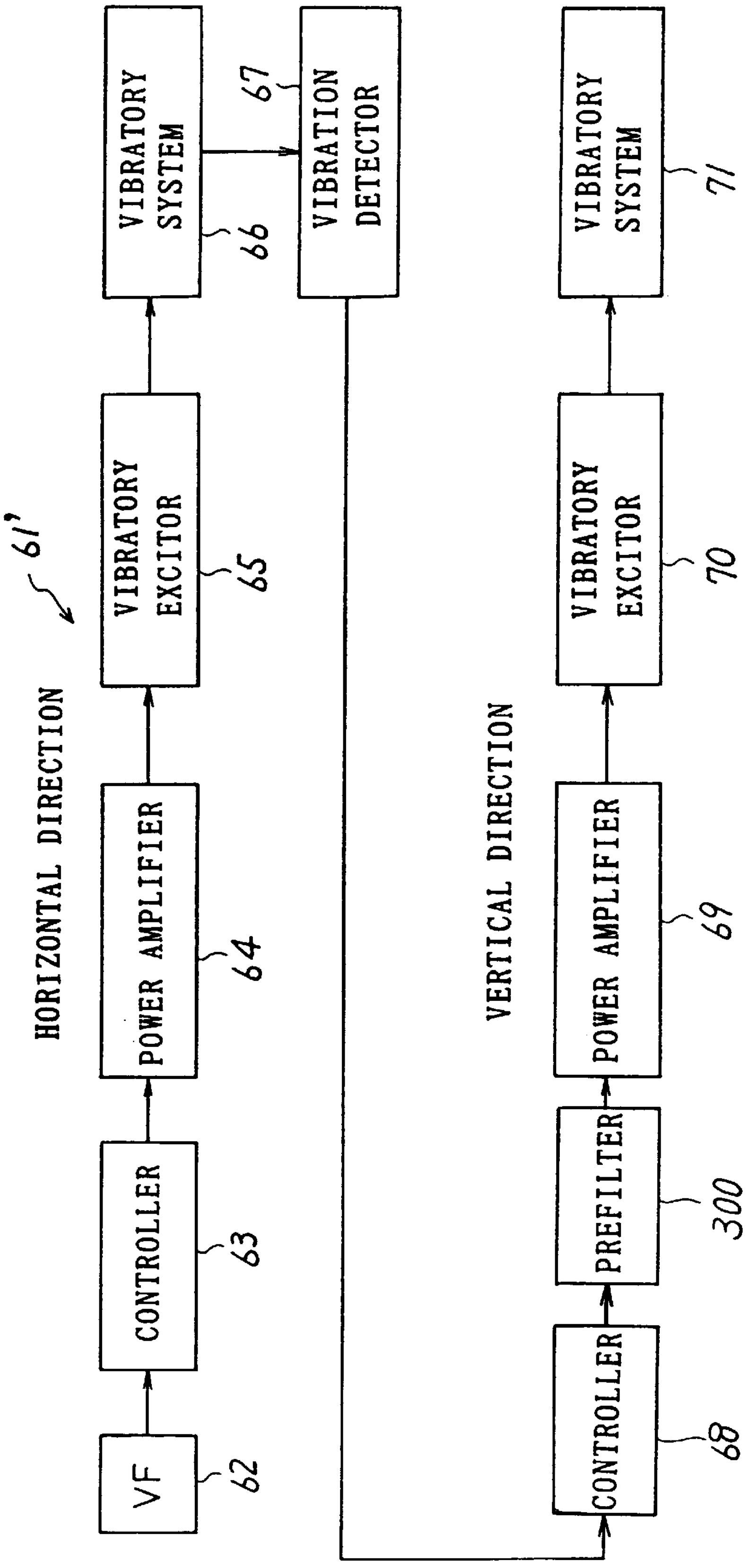
FIG. 18 is a block diagram of an elliptical vibratory apparatus according to a ninth embodiment of this invention.

FIG. 18 shows an elliptical vibratory apparatus 61' according to a ninth embodiment of this invention. Parts which correspond to those in the above embodiments, are denoted by the same reference numerals, the detail of which will be omitted. Also in this embodiment, the closed loop including the gain amplifier 202 and the phase compensator 201 are omitted. Instead, the prefilter 300 as in the seventh and eighth embodiments is provided. The operation and the effects are the same as in the above embodiment. Accordingly, the description will be omitted.

FIG. 20 to FIG. 23 show an elliptical vibratory apparatus according to a tenth embodiment of this invention. Parts which correspond to those in the above embodiments, are represented by the same reference numerals, the detail of which will be omitted.

Figure 21:
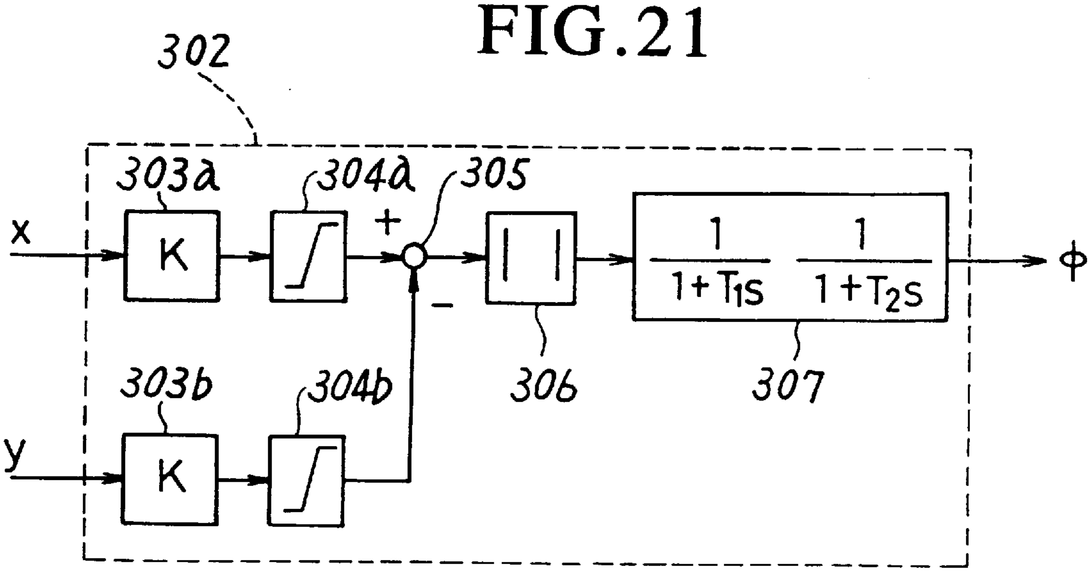
FIG. 21 is a block diagram of the details of the tenth embodiment.
Figure 22A:
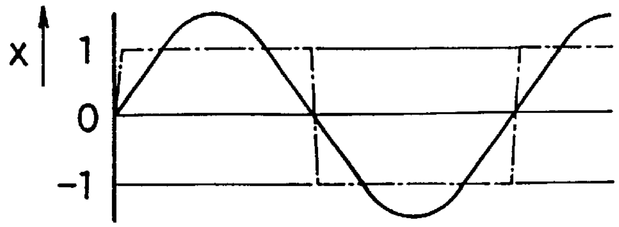
FIG. 22 are charts for explaining the operation of the tenth embodiment, A and B, wave forms of the horizontal and vertical vibration signals. C and D, wave forms rectified from the waves shown in A and B.
Figure 22B:
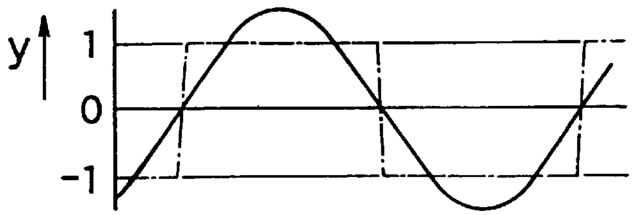
Figure 22C:
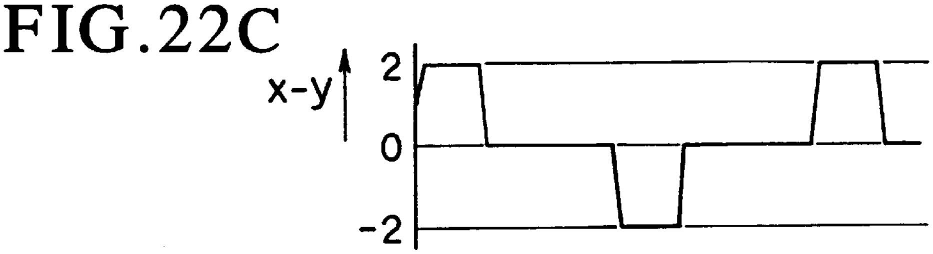
Figure 22D:
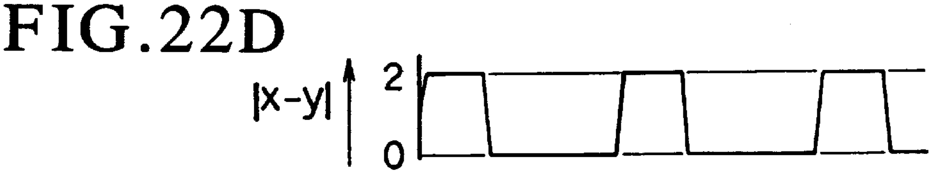

In this embodiment, the gain $\Delta k$ of the amplifier 202' is adjusted with a phase difference of the vibrational displacement of the vertical vibratory system. As shown in FIG. 21, a vibratory displacement signal x in the horizontal direction and another vibratory displacement signal y in the vertical direction are supplied to amplifiers 303*a* and 303*b* having gain K. The amplified outputs are supplied to limiters 304*a* and 304*b* having positive and negative saturation levels respectively. The amplified outputs are cut at predetermined levels in the limiters 304*a* and 304*b*. The obtained rectangular waves are compared with a comparator 305 and the comparison result is supplied to an absolute value circuit 306 and the output is supplied to a low-pass filter 307. The absolute value circuit 306 corresponds to a rectifying circuit. The low-pass filter 307 has the transfer factor of $\{1/(1+T_1s)\}\times\{1/(1+T_2s)\}$. The output is a phase difference output $\phi$. A phase difference between the horizontal vibrational displacement signal x and vertical vibrational displacement signal y is as shown in 22A and 22B. These signals are cut at the predetermined levels by the limiters 304*a* and 304*b*, and the substruction is effected between the horizontal vibrational displacement signal x and the vertical displacement signal y in the comparator 305. Thus, the comparison results are obtained as shown in FIG. 22C. The output is supplied to the absolute value circuit 306. Accordingly, the wave shape as shown in FIG. 22D can be obtained. Further, it is passed through the low-pass filter 307. Thus, a DC output in proportion to the difference, between the horizontal and vertical vibratory displacement signals x and y can be obtained as the phase difference output $\phi$.

Figure 23:
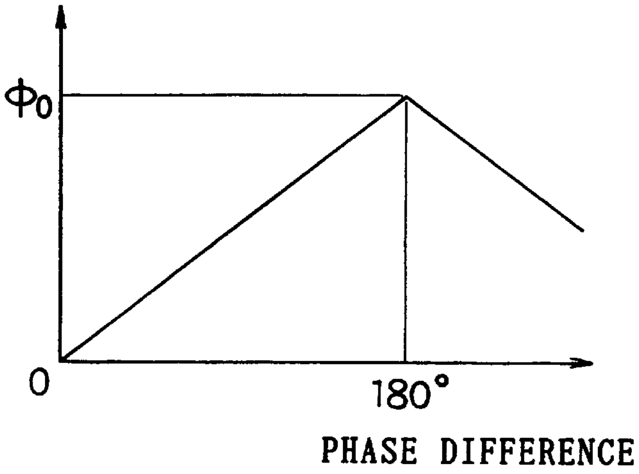
FIG. 23 is a chart for explaining the operation of the tenth embodiment.

The relationship between the phase difference and the detecting output$\phi_0$ is as shown in FIG. 23. It changes linearly within the angle of the 180 degrees and it is at the maximum value at the 180 degrees. Hereafter, it decreases linearly with angles. Such output is supplied to a phase difference controller 301, and so the controller 301 is controlled in accordance with the phase difference output. Thus, the gain $\Delta k$ of the amplifier 202' can be adjusted with the phase difference output. The phase angle between the horizontal and vertical vibrational displacements can be adjusted to the optimum angle of 60 degrees. Also in this embodiment, both the vertical vibratory system and the horizontal vertical system can be vibrated at the resonant frequency, even when anyone of the vibratory systems fluctuates with the change of the power source and the load to the movable parts. The phase difference can be securely and stably maintained at the angle of 60 degrees.

While the preferred embodiments have been described, variations thereto will occur to those skilled in the art within the scope of the present inventive concepts which are delineated by the following claims.

For example, in the above embodiments, the electromagnet is used as the vibratory exciter. It has the phase lag of 90 degrees. Instead, the vibratory exciter of the piezoelectric type or moving coil type may be used. However, it has no phase lag. Accordingly, when it is used as the vibratory exciter, $\alpha$=−90 degrees and $\beta$=−90 degrees are used instead of the values described in the above embodiment. Also in this case, the same effect and operation as in the above embodiments can be obtained.

Of course, vibratory exciters of any other kind having a certain phase lag, may be used in this invention. By selecting the value of the phase angle in the phase shifters, there can be the phase difference of 180 degrees in the negative feed-back loop. And, the phase difference of the 60 degrees can be obtained between the horizontal and vertical vibrations.

Further, the set phase difference angles are constant in the phase shifters 42 and 45 in the controller 39 and 34. Instead, they may be variable. A phase difference may be detected between outputs and/or inputs of any circuit blocks shown in the above embodiments, for adjusting the set phase difference of the phase shifters 42, 45.

Further, the optimum phase difference between the vertical and horizontal directions is equal to 60 degrees. According to the transport theory of the elliptical vibration, the optimum phase difference may be somewhat varied in accordance with the magnitude of the longer axis of the elliptical vibration. For example, it may be varied between the angles 45 degrees and 75 degrees. In this case, the angle α, β may be varied in accordance with the values of the optimum phase difference.

Further, the first (horizontal) direction and the second (vertical) direction may be inverted.

What is claimed is:

1. An elliptical vibratory apparatus comprising:

(A) a first controller which includes at least a first phase shifter, a first high-gain amplifier and a first saturating element;

(B) a first power amplifier for amplifying an output of said first controller;

(C) a first vibratory exciter receiving an output of said first power amplifier for generating a horizontal vibrational force in a horizontal direction;

(D) a horizontal vibrational system of an elliptical vibratory machine receiving said horizontal vibrational force;

(E) vibrational displacement detecting means for detecting a horizontal displacement of a movable part of said elliptical vibratory machine in said horizontal direction, the output of said vibrational detecting means being supplied to both the input of said first controller and the input of a second controller;

(F) said second controller including at least a second phase shifter, a second high-gain amplifier and a second saturating element;

(G) a second power amplifier for amplifying an output of said second controller;

(H) a second vibratory exciter receiving an output of said second power amplifier for generating a vertical vibrational force in a vertical direction;

(I) a vertical vibrational system of said elliptical vibratory machine receiving said vertical vibrational force;

(J) a closed loop being formed by said first controller, said first power amplifier, said first vibratory exciter, said horizontal vibrational system and said vibrational displacement detecting means, the output of said vibrational displacement means being negatively fed-back to said first controller in said closed loop; wherein a shift angle α of said first phase shifter is so predetermined that there is a phase difference of 180 degrees between the output terminal of said vibrational displacement detecting means and the input terminal of said first controller, when these terminals are cut off from each other, and a shift angle β of said second phase shifter is so predetermined as to obtain a predetermined phase difference between phase difference between said vibrational displacements of the horizontal and vertical vibrational systems for the optimum condition of said elliptical vibratory machine, said horizontal vibrational system being self-excitedly vibrated at its resonant frequency and said vertical vibrational system being self-excitedly vibrated.

2. An elliptical vibratory apparatus according to claim 1 in which the output of said horizontal vibrational displacement detecting means is supplied to amplitude controllers in which predetermined amplitudes are set, the differences between the predetermined amplitudes and the present amplitude is supplied to said first and second controllers and the amplitudes of the vibratory systems in said horizontal and vertical directions are so controlled as to be equal to said predetermined amplitudes, respectively.

3. An elliptical vibratory apparatus according to claim 1, in which a prefilter 300 is connected between said second controller 34 and said second power amplifier 35, said prefilter 300 consists of a notch filter for cutting the resonant frequency component and a band-pass filter for amplifying the frequency component higher by a few percentages than said resonant frequency.

4. An elliptical vibratory apparatus comprising:

(A) a first controller including at least a first phase shifter, a first high-gain amplifier and a first saturating element;

(B) a first power amplifier for power-amplifying an output of said first controller;

(C) a first vibratory exciter receiving an output of said first power amplifier for generating a horizontal vibrational force in a horizontal direction;

(D) a horizontal vibrational system of an elliptical vibratory machine receiving said horizontal vibrational force in the horizontal direction from said first vibratory exciter;

(E) vibrational displacement detecting means for detecting a horizontal displacement of a movable part of said elliptical vibratory machine in said horizontal direction, the output of said vibrational detecting means being supplied to both the input of said first controller and the input of a second controller;

(F) said second controller including at least a second phase shifter, a second high-gain amplifier and a second saturating element;

(G) a prefilter receiving an output of said second controller;

(H) a second power amplifier for power-amplifying an output of said prefilter;

(I) a second vibratory exciter receiving an output of said second power amplifier for generating a vertical vibrational force in a vertical direction perpendicular to said horizontal direction;

(J) a vertical vibrational system of said elliptical vibratory machine receiving said vertical vibrational force in the vertical direction from said second vibratory exciter;

(K) a closed loop being formed by said first controller, said first power amplifier, said first vibratory exciter, said horizontal vibrational system, and said vibrational displacement detecting means, the output of said vibrational displacement means being negatively fed-back to said first controller in said closed loop; wherein said prefilter consists of a notch filter for cutting the resonant frequency component and a band-pass filter for amplifying the frequency component higher by a few percentages than said resonant frequency, and a shift angle α of said first phase shifter is so predetermined that there is a phase difference of 180 degrees between the output terminal of said vibrational displacement detecting means and the input terminal of said first controller, when these terminals are cut off from each other, and a shift angle β of said second phase shifter is so predetermined as to obtain a predetermined phase difference between phase difference between said vibrational displacements of the horizontal and vertical vibrational systems for the optimum condition of said elliptical vibratory machine, said horizontal and vertical vibrational systems being self-excitedly vibrated at the resonant frequency.

5. An elliptical vibratory apparatus according to clam 4 in which the output of said horizontal vibrational displacement detecting means is supplied to amplitude controllers in which predetermined amplitudes are set, the differences between said predetermined amplitudes and the present amplitude are supplied to said first and second controllers and the amplitudes of the vibratory systems in said horizontal and vertical directions are so controlled to be equal to said predetermined amplitudes, respectively.

* * * * *